United States Patent
Kazama

(10) Patent No.: US 8,974,214 B2
(45) Date of Patent: Mar. 10, 2015

(54) DEVICE FOR MANUFACTURING OPTICAL FILM

(75) Inventor: Kenichi Kazama, Kobe (JP)

(73) Assignee: Konica Minolta Advanced Layers, Inc., Tokyo (JP)

(*) Notice: Subject to any disclaimer, the term of this patent is extended or adjusted under 35 U.S.C. 154(b) by 10 days.

(21) Appl. No.: 13/817,879

(22) PCT Filed: Aug. 22, 2011

(86) PCT No.: PCT/JP2011/068847
§ 371 (c)(1),
(2), (4) Date: Feb. 20, 2013

(87) PCT Pub. No.: WO2012/026416
PCT Pub. Date: Mar. 1, 2012

(65) Prior Publication Data
US 2013/0149405 A1    Jun. 13, 2013

(30) Foreign Application Priority Data
Aug. 24, 2010  (JP) ................... 2010-186781

(51) Int. Cl.
*B29C 43/24*  (2006.01)
*B29D 7/01*   (2006.01)
(Continued)

(52) U.S. Cl.
CPC . *B29D 7/01* (2013.01); *B29C 43/24* (2013.01); *B29C 43/46* (2013.01); *B29C 43/52* (2013.01); *B29C 43/22* (2013.01); *B29C 47/0021* (2013.01); *B29C 47/004* (2013.01); *B29C 47/14* (2013.01); *B29C 47/32* (2013.01);
(Continued)

(58) Field of Classification Search
CPC ........ B29C 43/24; B29C 43/46; B29C 43/52; B29C 43/22; B29C 47/0021; B29C 47/004; B29C 47/8845
USPC ............. 425/75, 224, 325, 363, 376.1, 378.1, 425/380, 194; 264/1.6, 2.7, 1.34, 234
See application file for complete search history.

(56) References Cited

U.S. PATENT DOCUMENTS

2009/0146346 A1* 6/2009 Noritsune ..................... 264/556

FOREIGN PATENT DOCUMENTS

| JP | 8-244098 A | 9/1996 |
| JP | 2003-89145 A | 3/2003 |

(Continued)

*Primary Examiner* — Joseph S Del Sole
*Assistant Examiner* — Lawrence D Hohenbrink, Jr.
(74) *Attorney, Agent, or Firm* — Lucas & Mercanti, LLP

(57) ABSTRACT

Provided is a device for manufacturing an optical film having satisfactorily reduced thickness unevenness, by using a melt-casting film forming method, which device includes a casting die for discharging a molten film-forming material including a thermoplastic resin into a film-like shape; a pair of a first rotation roll and a second rotation roll between which the discharged film-shaped molten article is pinched to be cooled and solidified to make the film-shaped molten article; and two pairs of wind shield plates each of which pairs are arranged between the shaft-direction ends of the first and second rotation rolls and an end part in the width-direction of the film-shaped molten article, wherein the wind shield plates are placed approximately perpendicular to the surface of the film-shaped molten article, and wherein each pair of the wind shield plates are placed approximately in parallel.

9 Claims, 10 Drawing Sheets

(51) Int. Cl.
*B29C 43/46* (2006.01)
*B29C 43/52* (2006.01)
*B29C 43/22* (2006.01)
*B29C 47/00* (2006.01)
*B29C 47/14* (2006.01)
*B29C 47/32* (2006.01)
*B29C 47/88* (2006.01)

(52) U.S. Cl.
CPC ......... B29C47/8845 (2013.01); *B29C 47/0057* (2013.01); *B29C 2947/92628* (2013.01); *B29C 2947/92647* (2013.01); *B29C 2947/92933* (2013.01)

USPC .......... 425/378.1; 425/75; 425/224; 425/325; 425/363; 425/376.1; 425/380; 264/1.6; 264/2.7; 264/1.34; 264/234

(56) References Cited

FOREIGN PATENT DOCUMENTS

| | | |
|---|---|---|
| JP | 2006-150806 A | 6/2006 |
| JP | 2009-90541 A | 4/2009 |
| JP | 2009-154518 A | 7/2009 |

* cited by examiner

DEVICE FOR MANUFACTURING OPTICAL FILM

CROSS REFERENCE TO RELATED APPLICATION

This Application is a 371 of PCT/JP2011/068847 filed on Aug. 22, 2011 which claimed priority of Japanese Application No. JP2010-186781 filed Aug. 24, 2010, both applications are incorporated by reference herein.

TECHNICAL FIELD

The present invention relates to a device for manufacturing an optical film.

BACKGROUND ART

Different optical films such as polarizing films and phase difference films used for liquid crystal displays are required to have no unevenness in thickness. In particular, monitors and television sets have become large and had higher definition, and which are requiring better quality.

In a manufacturing device of optical films based on the melt-casting film forming method, molten film-constituting-material containing a thermoplastic resin is discharged in a film shape from a flow casting die, and the film-shaped molten article is cooled and solidified by being sandwiched between a pair of rotation rolls. However, there is an issue that the flow casting die is heated to a high temperature, thereby making a large temperature difference between the flow casting die and the rotation rolls, then generating a ascending airflow between the flow casting die and the pair of rotation rolls, and airflows blow in toward the flow casting die from both sides in the width direction. The airflows flowing in hit the surface of the film-shaped molten article to generate a temperature distribution on the surface, thereby causing unevenness in thickness.

In such melt-casting film forming method, as a method for improving the unevenness in thickness there is proposed a technique in which a shielding plate is provided at each end between the width-direction end of the rotation roll and the width-direction end of the film-shaped molten article, perpendicularly to the surface of the molten article (Patent Document 1). In this technique, the shielding plates prevent the airflows from hitting the width-direction ends of the film-shaped molten article. However, gaps between the shielding plates and the rotation roll are not avoidable, and it is impossible to perfectly prevent the airflows from flowing in; therefore, the unevenness in thickness of optical films cannot be sufficiently avoided.

RELATED ART DOCUMENT

Patent Document

Patent Document 1: Japanese Laid-Open Patent Application Publication No. 2009-154518

SUMMARY OF THE INVENTION

Object of the Invention

An object of the present invention is to provide a device for manufacturing, by using a melt-casting film forming method, optical films in which unevenness is thickness is sufficiently avoided.

Means for Solving the Object

The present invention relates to a device for manufacturing an optical film, including: a flow casting die for discharging molten film-constituting-material containing a thermoplastic resin in a film state; a pair of rotation rolls for cooling and solidifying the discharged film-shape molten article by sandwiching the molten article; and a pair of wind shield plates A provided between the shaft-direction end of the rotation roll and the width-direction end of the film-shaped molten article, the pair of wind shield plates provided at each end and approximately parallel to each other and perpendicular to the surface of the film-shaped molten article.

Advantage of the Invention

According to the present invention, in the melt casting film forming method, not only airflows are prevented from flowing in toward the flow casting die from both sides in the width direction between the flow casting die and the pair of rotation rolls, but the temperature of the airflows unavoidably flowing in can be heated to a relatively high temperature. As a result, the temperature distribution on the surface of the film-shaped molten article is sufficiently prevented from being generated, whereby optical film can be manufactured with unevenness in thickness being sufficiently avoided.

BEST MODE FOR CARRYING OUT THE INVENTION

A device for manufacturing an optical film according to the present invention is based on a so-called melt-casting method, in which molten film-constituting-material containing a thermoplastic resin is discharged in a film state from a flow casting die, and the film-shaped molten article is solidified by being pinched by a pair of rotation rolls, thereby manufacturing an optical film.

Figure 1:
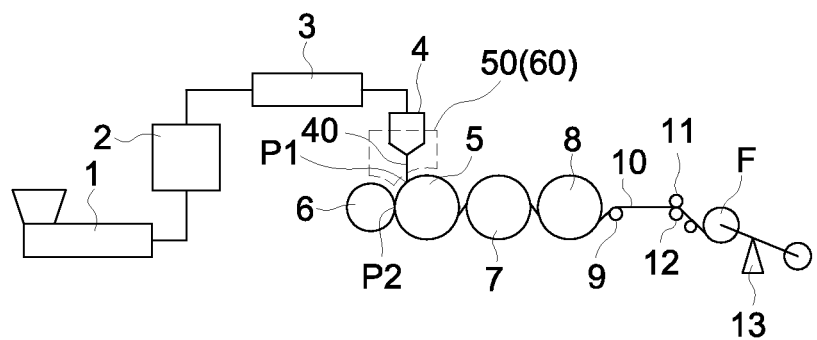
FIG. 1 is a schematic configuration diagram showing an example of a device for manufacturing an optical film according to the present invention.

A device for manufacturing an optical film according to the present invention is described in detail with reference to FIG. 1 through FIG. 12. FIG. 1 is a schematic configuration diagram generally showing an example of devices for manufacturing an optical film according to the present invention. FIG. 2 through FIG. 6 are schematic diagrams showing the configurations between a flow casting die and a rotation roll for cooling of the devices for manufacturing an optical film of the present invention, and also showing a first embodiment of a device according the present invention. FIG. 7 through FIG. 12 are schematic diagrams for showing the configurations between the flow casting die and the rotation roll for cooling of the devices for manufacturing an optical film according to the present invention, and also showing a second embodiment of a device according to the present invention. The first embodiment and the second embodiment are all the same except that the shape and/or figure of wind shield plates disposed approximately perpendicular to the surface of a film-shaped molten article 40 are different. In FIG. 1 through FIG. 12, common reference symbols for denoting symbols and/or denoting dimensions denote the same members and/or denote the same dimensions.

[Flow Casting Die]

A flow casting die 4 (also simply called "die") discharges molten film-constituting-material containing a thermoplastic resin in a film state. In detail, the below mentioned film-constituting-material containing a thermoplastic resin is mixed and melted, and a molten article 40 is then discharged in a film state from the flow casting die 4 by using an extruder 1, if desired, via a filter 2 and a static mixer 3.

The die 4 has a shape which is narrower toward a discharge port in the cross-section perpendicular to the longer direction. The die 4 typically has a discharge port formed in a slit shape at the lower end and discharges a molten article through the discharge port. As the die 4, a metal die is preferably used, and stainless steel is preferably used.

Examples of the die 4 include a coat hanger die and a T-die, and either of them is preferably used.

The die 4 is typically disposed such that the distance $L_0$ between the discharge port and the position at which the film-shaped molten article 40 lands at least one of rotation rolls 5 and 6 is 3 mm to 200 mm.

[Rotation Roll]

The rotation rolls are constituted by the first rotation roll 5 (cooling roll) and the second rotation roll 6 (elastic touch roll), and the rotation rolls cool and solidify the discharged film-shaped molten article by pinching the molten article therebetween. FIG. 1 shows, but not limits to, the configuration in which after the film-shaped molten article 40 once lands on the first rotation roll 5, the second rotation roll 6 presses it against the surface of the first rotation roll 5 with a predetermined pressure; and the film-shaped molten article 40 may land directly onto the position between the first rotation roll 5 and the second rotation roll 6 and may be pressed with a predetermined pressure.

The first rotation roll 5 is also called a first cooling roll or a cooling drum. As the first rotation roll 5, a roll made of material such as carbon steel, stainless steel, or resin can be used, for example, without any specific limitation. The surface of the roll is preferably plated with HCr (hard chromium).

The second rotation roll 6 is also called as a touch roll. As the second rotation roll 6, an elastic touch roll is preferably used without any specific limitation. As the elastic touch roll, there is preferably used a touch roll which is disclosed in Registered Japanese Patent No. 3194904, Registered Japanese Patent No. 3422798, Japanese Laid-Open Patent Application Publication No. 2002-36332, and Japanese Laid-Open Patent Application Publication No. 2002-36333. Commercially available ones also can be used.

The first rotation roll 5 and the second rotation roll 6 preferably have a high surface accuracy, and surface accuracies are preferably 0.3 S or less, more preferably 0.1 S or less.

The second rotation roll 6 presses the film-shaped molten article 40 against the first rotation roll 5 with a pressing means. In this arrangement, the line pressure with which the second rotation roll 6 presses the film-shaped molten article 40 can be adjusted by an air piston and the like, and the line pressure preferably is 0.98 N/cm to 980 N/cm, more preferably 9.8 N/cm to 500 N/cm.

The surface temperatures of the first rotation roll 5 and the second rotation roll 6 are not specifically limited and are preferably set typically at 80° C. to 150° C. more specifically 100° C. to 130° C., and 20° C. to 150° C., more specifically 30° C. to 120° C. for the first rotation roll 5 and the second rotation roll 6, respectively.

The first rotation roll 5 and the second rotation roll 6 may have a diameter which is thinner at the both ends or may have a flexible roll surface, for more uniform contact with the film-shaped molten article.

Figure 4:
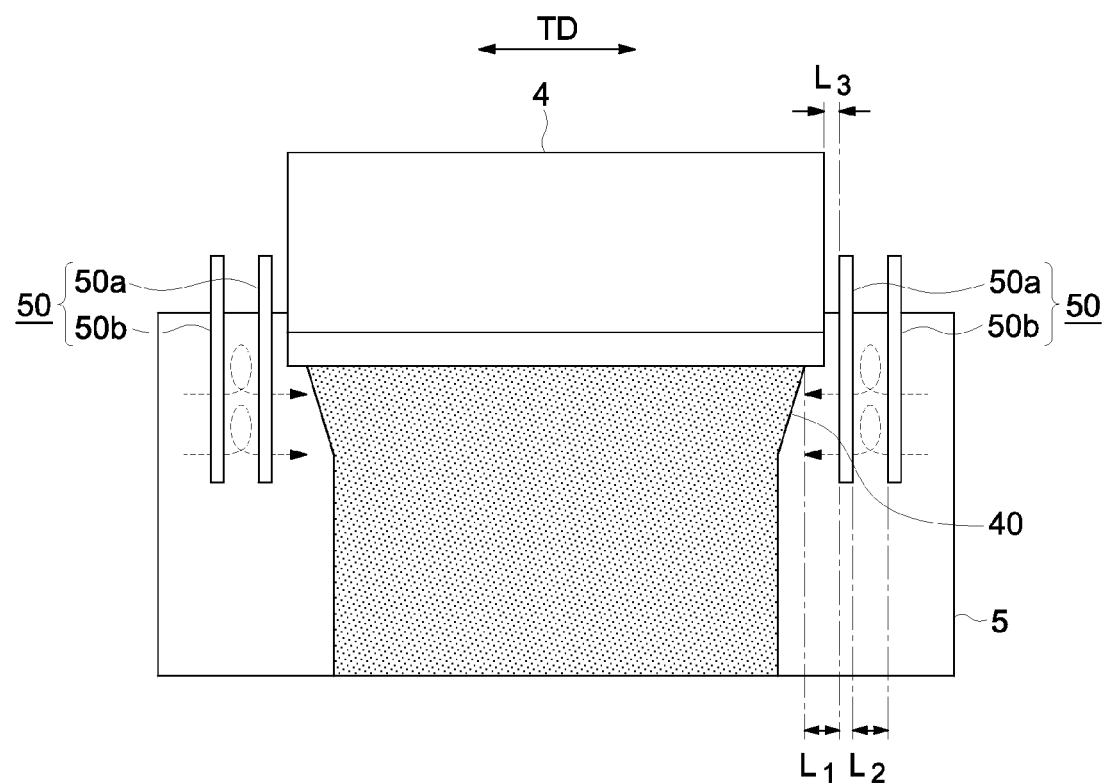
FIG. 4 is a schematic front view when the flow casting die, the first rotation roll, and a double-paned wind shield members when viewed through the second rotation roll from a direction y in FIG. 2.
Figure 5:
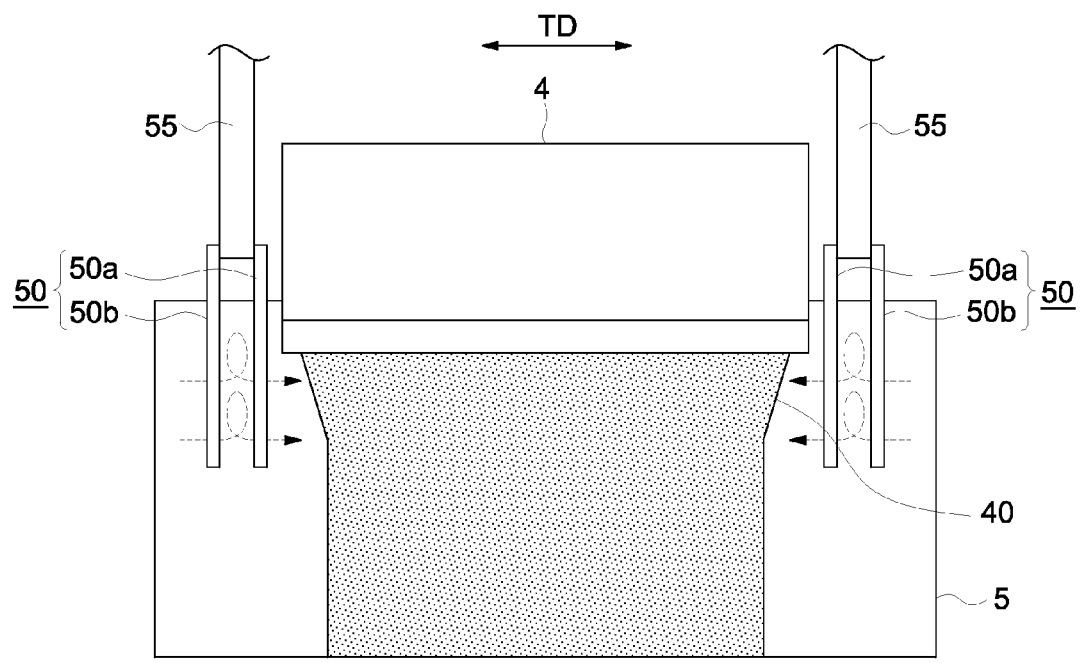
FIG. 5 is a schematic front view of the configuration between the flow casting die and the rotation roll for cooling when viewed through the second rotation roll from the second rotation roll side, in a preferred aspect 1B of the first embodiment.
Figure 6:
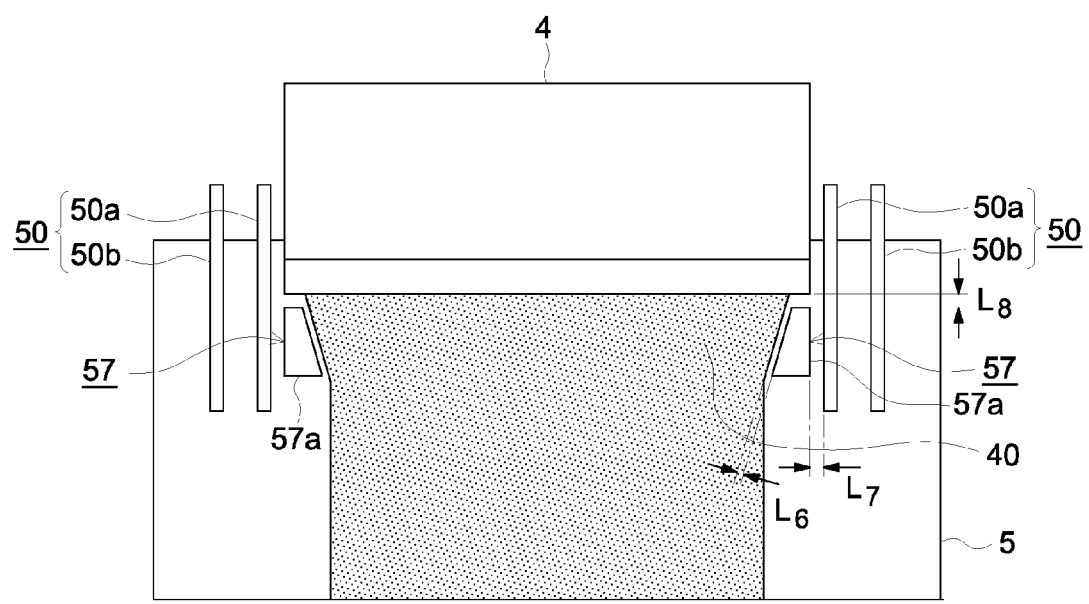
FIG. 6 is a schematic front view of the configuration between the flow casting die and the rotation roll for cooling when viewed through the second rotation roll from the second rotation roll side, in another preferred aspect 1C of the first embodiment.
Figure 10:
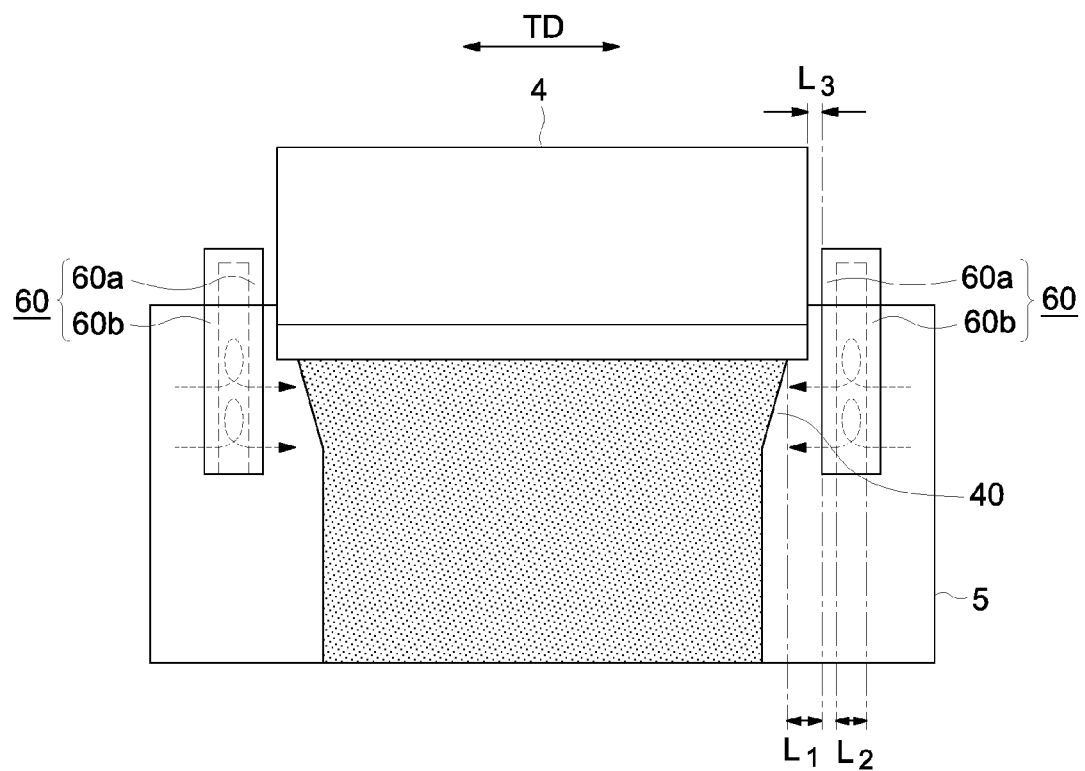
FIG. 10 is a schematic front view of the flow casting die, the first rotation roll, and the box-shaped wind shield members when viewed through the second rotation roll from the direction y in FIG. 7.
Figure 11:
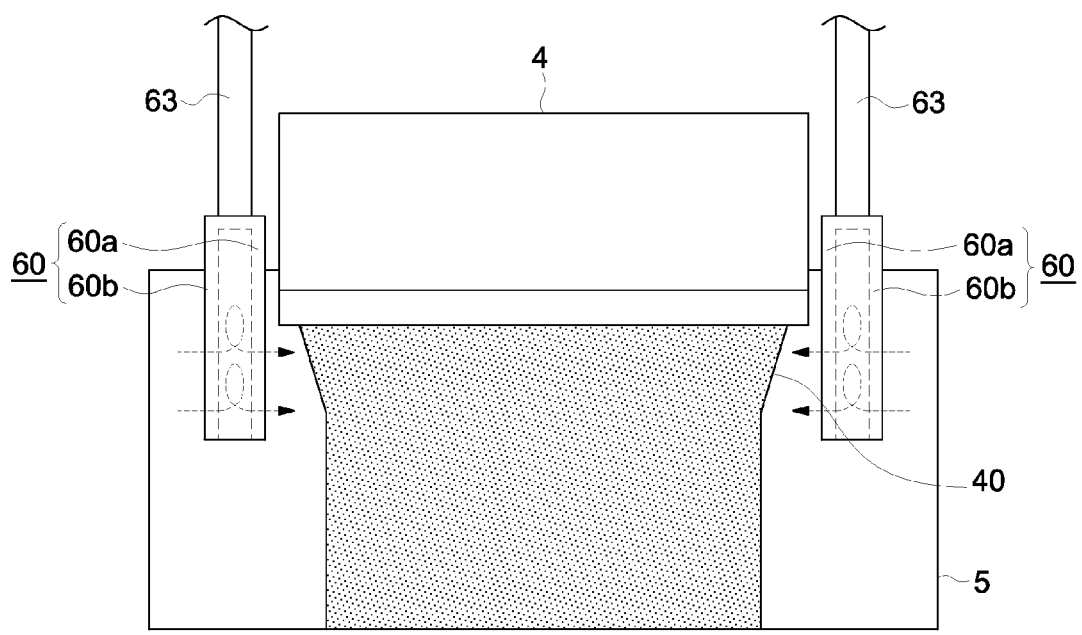
FIG. 11 is a schematic front view of the configuration between the flow casting die and the rotation roll for cooling when viewed through the second rotation roll from the second rotation roll side in a preferred aspect 2B of the second embodiment.
Figure 12:
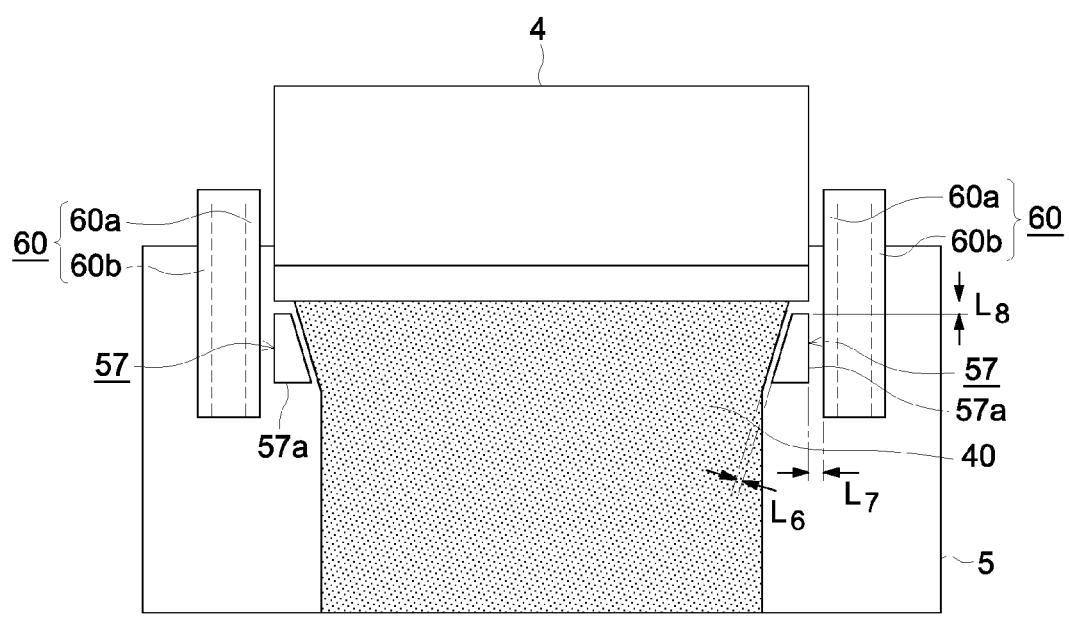
FIG. 12 is a schematic front view of the flow casting die and the rotation roll for cooling when viewed through the second rotation roll from the second rotation roll side, in another preferred aspect 2C of the second embodiment.

The manufacturing device of the present invention shown in FIG. 1 has, between the flow casting die and the rotation roll for cooling, any wind shield members selected from double-paneled first wind shield members 50 shown in FIG. 2 to FIG. 5, double-paneled first wind shield members 50 and single-paneled second wind shield members 57 shown in FIG. 6, box-shaped wind shield members 60 shown in FIG. 7 to FIG. 11, and box-shaped wind shield members 60 and single-paneled second wind shield member 57 shown in FIG. 12.

[Double-Paneled First Wind Shield Member 50]

The double-paneled first wind shield member 50 has two wind shield plates 50a and 50b which are disposed approximately perpendicular to the surface of the film-shaped molten article 40, and it is distinguished from the below mentioned second wind shield member 57 which is placed approximately on the same plane as the surface of the film-shaped molten article 40.

First Embodiment

Figure 2:
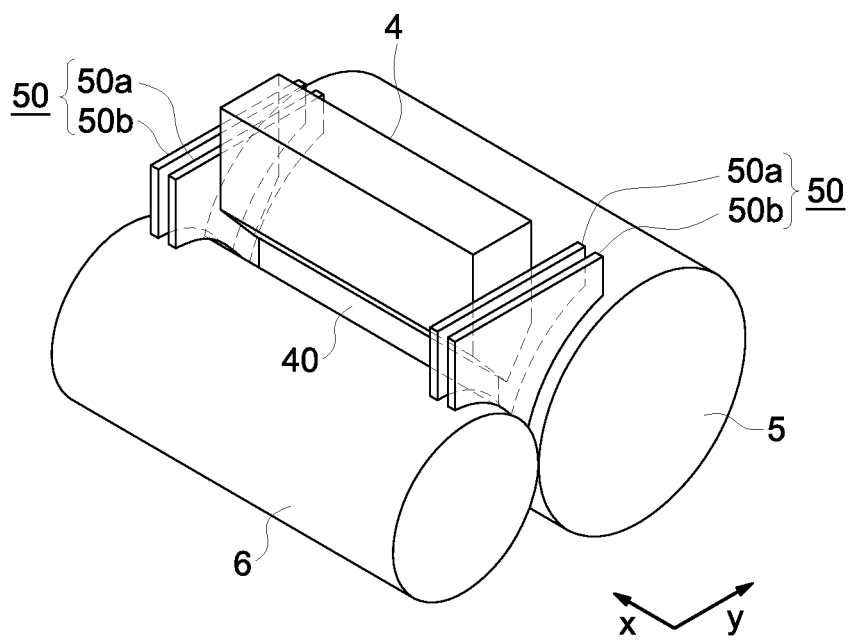
FIG. 2 is an enlarged perspective view showing a configuration, between a flow casting die and a rotation roll for cooling, of a first embodiment.
Figure 3:
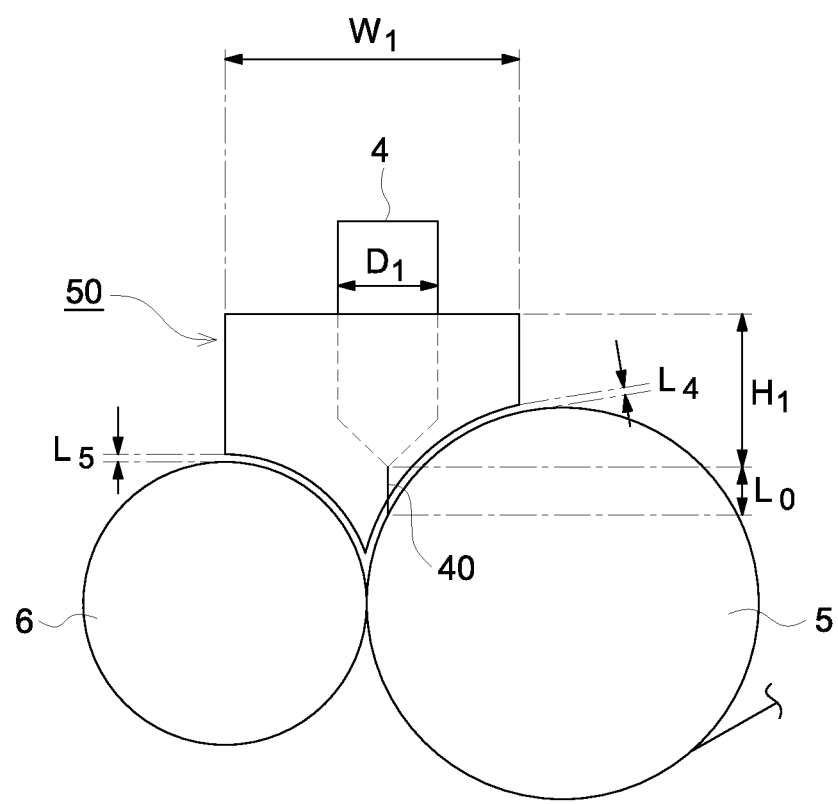
FIG. 3 is a schematic side view when the flow casting die, a first rotation roll, a second rotation roll, and wind shield plates A are viewed from a direction x in FIG. 2.

The first embodiment of the double-paneled first wind shield members 50 are illustrated in FIG. 2 to FIG. 6. FIG. 2 is an enlarged perspective view showing a configuration between a flow casting die and a rotation roll for cooling of the first embodiment. FIG. 3 is a schematic side view when the flow casting die, a first rotation roll, a second rotation roll, and the double-paneled wind shield members 50 are viewed from a direction x in FIG. 2. FIG. 4 is a schematic front view of the flow casting die, the first rotation roll, and the double-paneled first wind shield members 50 when viewed through the second rotation roll from a direction y in FIG. 2. FIG. 5 is a schematic front view of the configuration between the flow casting die and the rotation roll for cooling when viewed through the second rotation roll 6 from the second rotation roll 6 side, in a preferred aspect 1B of the first embodiment. FIG. 6 is a schematic front view of the configuration between the flow casting die and the rotation roll for cooling when viewed through the second rotation roll 6 from the second rotation roll 6 side, in another preferred aspect 1C of the first embodiment.

The two wind shield plates 50a and 50b of the double-paneled first wind shield members 50 are mounted on the both end, two wind shield plates for each end in the shaft direction of the first rotation roll 5. In detail, the two wind shield plates 50a and 50b are provided between the shaft-direction ends of the first rotation roll 5 and the second rotation roll 6 and the width-direction end of the film-shaped molten article 40, approximately perpendicular to the surface of the film-shaped molten article 40, with two wind shield plates being provided for each end in the shaft direction of the first rotation roll 5 and being approximately parallel to each other. In the first embodiment, the two wind shield plates 50a and 50b at each end are not linked to each other and each have a plate shape (double-panel type). In other words, such two wind shield plates 50a and 50b are not linked to each other and arranged as independent double-paneled wind shields.

The two wind shield plates 50a and 50b shield the film-shaped molten article 40, after being discharged from the die 4 and before getting pinched with the rotation rolls 5 and 6, at its width-direction ends, thereby preventing the airflow from flowing in among the die 4, the first rotation roll 5, and the second rotation roll 6 toward the die 4 from the both sides in the width direction (TD: Transverse Direction). In addition, the first wind shield member 50 is used to be the two wind shield plates 50a and 50b for each end; thus, the airflow unavoidably flowing in through the gap among the first rotation roll 5, the second rotation roll 6, and the two wind shield plates 50a and 50b is temporarily remains in the space between the two wind shield plates 50a and 50b as shown in FIG. 4. In this arrangement, the die 4 is heated to a relatively high temperature, and the two wind shield plates 50a and 50b are heated to a relatively high temperature, being located in a vicinity of the die 4. For this reason, the airflow remaining between the two wind shield plates 50a and 50b are heated; thus, even if it flows in among the die 4, the first rotation roll 5, and the second rotation roll 6 after remaining, the temperature distribution on the surface of the film-shaped molten article 40 is sufficiently prevented from being generated, whereby an optical film is produced in which unevenness in thickness is sufficiently avoided.

The width and the height of the two wind shield plates 50a and 50b are not specifically limited as long as the wind shield plate A can block the air flow flowing in among the die 4, the first rotation roll 5, and the second rotation roll 6 towards the flow casting die from the both sides in the width direction. The width $W_1$ (see FIG. 3) of the two wind shield plates 50a and 50b only need to be the same as the depth $D_1$ of die 4 or more as shown in FIG. 3, for example. The height of the upper ends of the two wind shield plates 50a and 50b is a height $H_1$ (see FIG. 3) measured from the discharge port of the die 4 and typically is 50 mm to 200 mm.

The distance $L_1$ (see FIG. 4) between the width-direction end of the film-shaped molten article 40 and the wind shield plate 50a of the two wind shield plates 50a and 50b, which is closer to the width-direction end of the film-shaped molten article 40 is preferably as small as possible in view of shielding the molten article end from the airflow flowing in, and preferably is 20 mm to 200 mm typically. The width of the film-shaped molten article 40 is getting narrower after it is discharged from the die 4 and before it lands on the first rotation roll 5 as shown in FIG. 4; thus, the distance $L_1$ represents the distance (minimum value) just after the film-shaped molten article 40 is discharged from the die 4.

The distance $L_2$ (see FIG. 4) between the two wind shield plates 50a and 50b is not specifically limited as long as the airflow flowing in can remain in the space therebetween, and is typically 5 mm to 100 mm, preferably 10 mm to 80 mm, and more preferably 20 mm to 80 mm. The distance $L_3$ (see FIG. 4) between the side surface of the die 4 and the wind shield plate 50a is not specifically limited and is not necessarily secured, but it preferably is 0 mm to 50 mm.

The gap distances $L_4$ and $L_5$ (see FIG. 3) between the double-paneled first wind shield member 50 and each of the first rotation roll 5 and the second rotation roll 6 are preferably as small as possible in terms of preventing the airflow from flowing in, and each preferably are 0.3 mm to 3 mm independently. The gap distances between the wind shield plate 50a and each of the first rotation roll 5 and the second rotation roll 6, and between the wind shield plate 50b and each of the first rotation roll 5 and the first rotation roll 6 only need to be in the above range, and they are preferably the same.

As the two wind shield plates 50a and 50b of the double-paneled first wind shield member 50, a plate like member such as stainless steel, steel, or a high-temperature resin can be used, for example, and there is no specific limitation as long as it is superior in shield of airflow and has heat resistance enough to keep its shape despite the heat of the die 4, without any specific limitation.

The thicknesses of the two wind shield plates 50a and 50b of the double-paneled first wind shield member 50 are not specifically limited, and each are 0.5 mm to 3 mm independently.

The two wind shield plates 50a and 50b may be directly mounted on the side surface of the die 4 or may be supported and fixed by not shown supporting members.

In a preferred aspect 1A of the first embodiment, at least one of the two wind shield plates 50a and 50b is heated. With this arrangement, the remaining airflow is effectively heated; thus, the unevenness in thickness is more sufficiently avoided. From the point of view of effectively heating the remaining airflow, at least the wind shield plate 50b on outer side of the two wind shield plates 50a and 50b is preferably heated.

As a heating method, there is no limitation as long as the temperature of the gas between the two wind shield plates 50a and 50b can be raised, for example, a heater may be buried in at least one of the two wind shield plates 50a and 50b, or a heater may by attached on at least one of the surfaces of the two wind shield plates 50a and 50b.

Regarding the heater, a thin heater such as an electrically-heated wire, an aluminum cast heater, a rubber heater, or a belt heater is used, and the output preferably is set so as to heat the temperature of the gas between the two wind shield plates A (50a and 50b) up to 100° C. to 250° C., specifically preferably 150° C. to 250° C., and more preferably 200° C. to 250° C. Such gas temperature only needs to be realized when an optical film is continuously produced.

In another preferred aspect 1B of the first embodiment, suction or supply of heated gas is performed between the two wind shield plates 50a and 50b. For example, as shown in FIG. 5, there is a nozzle provided from upper between the two wind shield plates 50a and 50b, and the nozzle suctions or supplies heated gas. The suction more sufficiently prevents the airflow from flowing in. The supplied heated gas makes the temperature of the airflow flowing in relatively high. In either case, the temperature distribution on the surface of the film-shaped molten article is consequently prevented from being generated more sufficiently, and the unevenness in thickness is avoided more sufficiently. From the point of view of prevention of generation of temperature distribution, it is preferable that heated gas is supplied. The embodiment 1B shown in FIG. 5 is the same as the embodiment shown in FIGS. 2-4 except that the suction or the supply of heated gas is performed through nozzle 55 between the two wind shield plates 50a and 50b in the embodiment 1B.

If the amount of suction is too small, no effect is expected, but if it is too large, the inner airflow is disturbed; therefore, it is set at 10 l/min to 300 l/min, preferably 20 l/min to 200 l/min.

Supply amount of the heated gas is generally not effective if it is too small, but if it is too large, the inner airflow is disturbed; therefore, it is 10 l/min to 300 l/min, preferably 20 l/min to 200 l/min.

The temperature of the supplied heated gas is preferably adjusted so that the gas temperature between the two wind shield plates 50a and 50b is within the same range as in the embodiment 1B.

The supplied gas can be air, nitrogen, or the like, and air is preferable.

In another preferred aspect 1C of the first embodiment, a single-paneled second wind shield member 57 is additionally provided between the wind shield plate 50a of the two wind shield plates 50a and 50b, which is closer to the width-direction end of the film-shaped molten article 40 and the width-direction end of the film-shaped molten article 40. In detail, the single-paneled second wind shield member 57 is constituted by a single wind shield plate 57a. As shown in FIG. 6, the single-paneled second wind shield member 57 is disposed so as to make approximately the same plane as the surface of the film-shaped molten article 40 after being discharged from the die 4 and before landing on the first rotation roll 5. Such wind shield plate 57a reduces the airflow flowing, just outside the film-shaped molten article 40, in the direction (in the front-and-back direction of the sheet in FIG. 6) approximately perpendicular to the surface of the film-shaped molten article 40. This arrangement more sufficiently prevents the temperature distribution on the surface of the film-shaped molten article from being generated, thereby more sufficiently avoiding the unevenness in thickness. The embodiment 1C shown in FIG. 6 is the same as the embodiment shown in FIGS. 2-4 except that it has been additionally provided with the single-paneled second wind shield members 57.

The wind shield plate 57a has a trapezoidal shape because the width of the film-shaped molten article 40 is getting continuously narrower after it is discharged from the die 4 and before it lands on the first rotation roll 5 as shown in FIG. 6.

The gap distance $L_6$ between the wind shield member 57 and the film-shaped molten article 40 and the gap distance between the wind shield member 57 and the first rotation roll 5 are each independently 1 mm to 10 mm.

The gap distance $L_7$ between the wind shield plate 57a and the wind shield plate 50a and the gap distance $L_8$ between the wind shield plate 57a and the die 4 are not necessarily secured but are typically each 3 mm or less independently. The wind shield plate 57a preferably has a thickness of 0.1 mm to 5.0 mm in terms of strength.

Material and a thickness of the wind shield plate 57a are not specifically limited, but may be similarly made as the two wind shield plates 50a and 50b of the double-paneled wind shield member 50, for example.

As preferred aspects of the first embodiment, the above aspects 1A, 1B, and 1C are described separately, but when these aspects are adopted together, the unevenness in thickness will be prevented more efficiently. For example, at least any two selected from the aspects 1A, 1B, and 1C are preferably adopted together, and in particular at least the aspects 1A and 1B are employed together. In the first embodiment, the most preferable effect is realized in prevention of the unevenness in thickness when all the aspects 1A, 1B, and 1C are employed together. The first embodiment is the most preferable in tams of facility cost and easiness of maintenance.

The double-paneled first wind shield member 50 is shown in FIG. 2 to FIG. 6 have the two wind shield plates 50a and 50b, but it may have three or more of wind shield plates.

Second Embodiment

Figure 7:
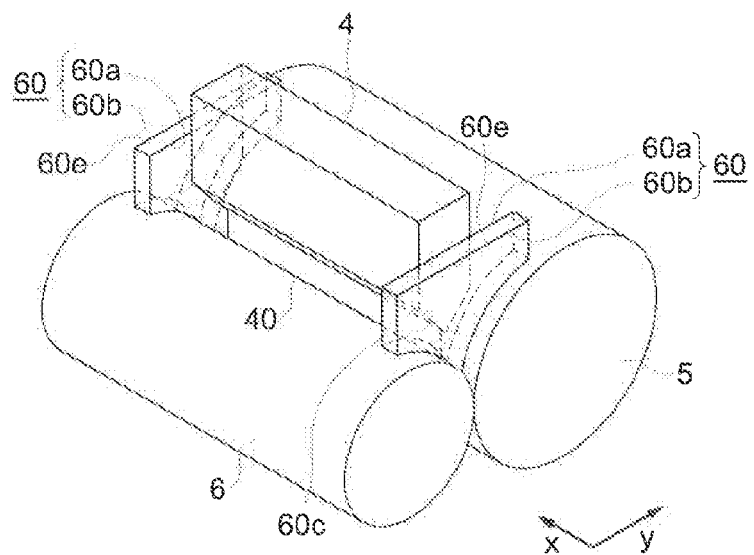
FIG. 7 is a enlarged perspective view showing a configuration between the flow casting die and the rotation roll for cooling of a second embodiment.
Figure 8:
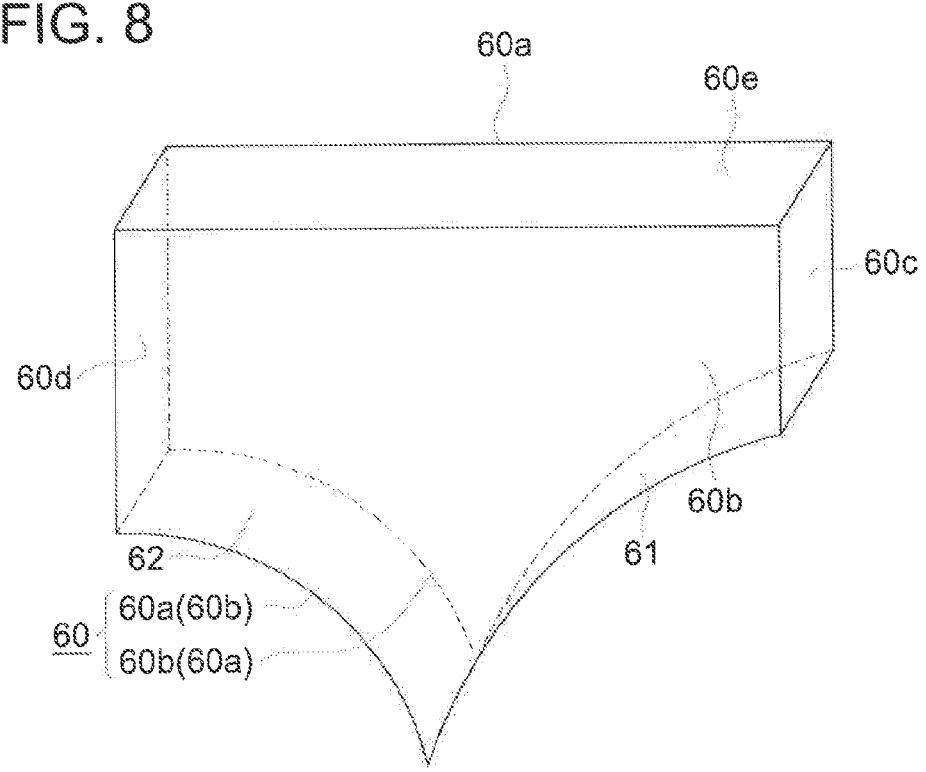
FIG. 8 is an enlarged schematic diagram of a box-shaped wind shield member of the second embodiment.
Figure 9:
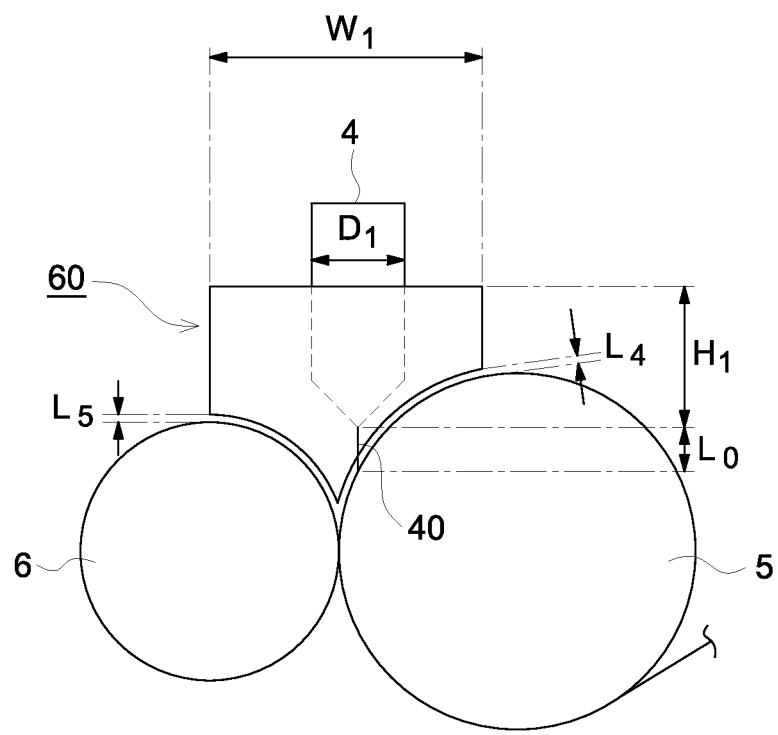
FIG. 9 is a schematic side view when the flow casting die, the first rotation roll, a second rotation roll, and the box-shaped wind shield member when viewed from the direction x in FIG. 7.

A second embodiment of a box-shaped third wind shield member 60 is shown in FIG. 7 to FIG. 12. FIG. 7 is an enlarged perspective view showing a configuration between the flow casting die and the rotation roll for cooling of the second embodiment. FIG. 8 is an enlarged schematic diagram of a box-shaped third wind shield member 60 of the second embodiment. FIG. 9 is a schematic side view of the flow casting die, the first rotation roll, the second rotation roll, and the box-shaped wind shield member when viewed from the direction x in FIG. 7. FIG. 10 is a schematic front view of the flow casting die, the first rotation roll, and the box-shaped third wind shield members 60 when viewed through the second rotation roll from the direction y in FIG. 7. FIG. 11 is a schematic front view of the configuration between the flow casting die and the rotation roll for cooling when viewed through the second rotation roll from the second rotation roll side, in a preferred aspect 2B of the second embodiment. FIG. 12 is a schematic front view of the flow casting die and the rotation roll for cooling when viewed through the second rotation roll from the second rotation roll side, in another preferred aspect 2C of the second embodiment.

In the second embodiment, the box-shaped third wind shield member 60 has a box shape, is constituted by the two wind shield plates 60a and 60b whose three sides are connected with each other via connection members 60c, 60d, and 60e, and has an open sides facing the first rotation roll 5 and the second rotation roll 6 (see FIG. 8). The connection member 60e constitutes a top panel of the box-shaped third wind shield member 60. The wind shield plates 60a and 60b and the connection members 60c and 60d each constitute a side panel. The two wind shield plates 60a and 60b are approximately parallel.

In the second embodiment, the box-shaped third wind shield member 60 is placed, similarly to the first embodiment, between the shaft-direction ends of the first rotation roll 5 and the second rotation roll 6 and the width-direction end of the film-shaped molten article 40 such that the wind shield plate (side panel) 60a and the wind shield plate (side panel) 60b are approximately perpendicular to the surface of the film-shaped molten article 40.

The reference numeral 61 in the wind shield member 60 shown in FIG. 8 denotes an open side facing the first rotation roll 5, and the reference numeral 62 denotes an open side facing the second rotation roll.

In the second embodiment, when the box-shaped third wind shield member 60 is used in a box shape, the remaining air current is heated more effectively; thus, the box-shaped third wind shield member 60 prevents the temperature distribution on the surface of the film-shaped molten article more sufficiently than the double-paneled first wind shield member 50 in the first embodiment, which has a simple double-panel structure, whereby the unevenness in thickness is more sufficiently prevented.

Since the box-shaped third wind shield member 60 of the second embodiment is the same as the double-paneled wind shield member 50 of the first embodiment except that it has a box shape, the detailed description of the third box-shaped wind shield member 60 of the second embodiment is omitted. As the description of the box-shaped third wind shield member 60, the description of the first embodiment is used except the descriptions other than the shape of the double-paneled second wind shield member 50. For example, the description of the dimensions of the double-paneled second wind shield member 50, the gap distances around it, and the like are used. It should be noted that the double-paneled second wind shield member 50, FIG. 2 to FIG. 6, and the preferred aspects 1A to 1C in the description of the first embodiment correspond to the box-shaped third wind shield member 60, FIG. 7, FIG. 9 to FIG. 12, and the preferred aspects 2A to 2C in the second embodiment, respectively. FIG. 7 and FIG. 9 to FIG. 12 are the same as the FIG. 2 to FIG. 6, respectively, except that the two wind shield plates (side panels) 60a and 60b constitute the box-shaped third wind shield member 60 for one end, and the descriptions of their drawings are omitted unless specifically mentioned.

In the second embodiment, a material and a thickness of the box-shaped third wind shield member 60 is not specifically limited, and they may be the same as those of the double-paneled second wind shield member 50 of the first embodiment, for example.

The preferred aspects 2A to 2C of the box-shaped third wind shield member 60 of the second embodiment are the same as the preferred aspect 1A to 1C of the first embodiment, respectively, except that the preferred aspects 2A to 2C uses the box-shaped third wind shield member 60.

In detail, in the preferred aspect 2A of the second embodiment, at least one of the wind shield plates (side panels) 60a and 60b of the box-shaped third wind shield member 60 is heated. This arrangement allows the remaining airflow to be effectively heated, thereby preventing the unevenness in thickness more sufficiently. From the point of view of effective heating of the remaining airflow, at least the outer wind shield plate (side panel) 60b of the wind shield plates (side panels) 60a and 60b is preferably heated.

Heating method and heaters used in the heating are the same as those in the preferred aspect 1A of the first embodiment.

In detail, in another preferred aspect 2B of the second embodiment, suction or supply of heated gas is performed between the two wind shield plates (side panels) 60a and 60b constituting part of the box-shaped third wind shield member 60, in other words, inside the box-shaped wind shield member 60. For example, as shown in FIG. 11, through the connection members (top panels) 60e of the box-shaped third wind shield member 60 a nozzle 63 is connected, and the nozzle suctions or supplies heated gas. The suction prevents more sufficiently airflow from flowing in. The supply of the heated gas makes the temperature of the airflow flowing in relatively high. In either case, the temperature distribution on the surface of the film-shaped molten article is consequently prevented from being generated more sufficiently, and the unevenness in thickness is avoided more sufficiently. From the point of view of preventing temperature distribution from being generated, it is preferable that heated gas is supplied. The embodiment 2B shown in FIG. 11 is the same as the embodiment shown in FIGS. 7 and 9-10 except that the suction or the supply of heated gas is performed through nozzle 63 between two wind shield plates (side panels) 60a and 60b (inside the box-shaped third wind shield member 60).

The amount of the suction, the temperature, and the type of the supplied heated gas are the same as those in the preferred aspect 1B of the first embodiment.

In another preferred aspect 2C of the second embodiment, in detail, a wind shield plate 57a is additionally provided as the second wind shield member 57 between the width-direction end of the film-shaped molten article 40 and the wind shield plate (side panel) 60a, which is one of the two wind shield plates (side panels) 60a and 60b constituting part of the box-shaped third wind shield member 60 and is closer to the width-direction end of the film-shaped molten article 40. In detail, as shown in FIG. 12, the wind shield plate 57a is placed so as to make approximately the same plane as the surface of the film-shaped molten article 40 after being discharged from the die 4 and before landing on the first rotation roll 5. Such wind shield plate 57a reduces the airflow flowing in, just outside the film-shaped molten article 40, in the direction (the front-and-back direction of the sheet in FIG. 12) approximately perpendicular to the surface of the film-shaped molten article 40. This arrangement more sufficiently prevents the temperature distribution on the surface of the film-shaped molten article from being generated, thereby more sufficiently avoiding the unevenness in thickness. The embodiment 2C shown in FIG. 12 is the same as that of the embodiment shown in FIG. 7 and FIG. 9 to FIG. 10 except that it has been additionally provided with the second wind shield member 57.

The shape of the wind shield plate 57a, the gap distance around the wind shield member 57, and the material and the thickness of the wind shield plate 57a are the same as those in the preferred aspect 1C of the first embodiment.

As preferred aspects of the second embodiment, the above aspects 2A, 2B, and 2C were separately described, but when those aspects are adopted together, the unevenness in thickness will be more effectively prevented. For example, at least any two selected from the aspects 2A, 2B, and 2C are preferably adopted together, and in particular at least the aspects 2A and 2B are employed together. In the second embodiment, when all the aspects 2A, 2B, and 2C are employed together, the most preferable effect is realized in prevention of the unevenness in thickness.

In addition, in the above description, description is made on the case that the inside of the box-shaped wind shield member 60 is a single compartment, but there may be a separation plate to divide the inside into two compartments.

[Method for Manufacturing Optical Film]

An optical film is produced by using the manufacturing device. In detail, the film-constituting-material containing a thermoplastic resin is heated and melted; the molten article is discharged from the flow casting die 4 in a film state; and the film-shaped molten article is cooled and solidified, being pinched between the pair of the first rotation roll 5 and the second rotation roll 6. Then, the film is further cooled being conveyed with the second cooling roll 7 and the third cooling roll 8, if desired. The cooled and solidified film may be subjected to a stretching process, and the film is then wound by a winding device 13.

The method for heating and melting is not specifically limited, and melt extrusion is performed with extruder 1, for example. When melt extrusion is performed by a single screw or double screw extruder 1, the melting temperature is preferably 200° C. to 300° C. The raw materials are preferably introduced into the extruder from a hopper in the vacuum state, a reduced pressure state, or an inert gas atmosphere, in order to prevent oxidation decomposition and the like. The flow rate of extrusion is preferably stabilized by introducing a gear pump.

The heated molten article is preferably filtered with a filter 2 to remove foreign particles before it is extruded from the die. As the filter 2, a leaf disc type filter is preferably used, and in particular, a sintered stainless steel fiber filter is preferably used. The sintered stainless steel fiber filter is made by unifying the contact portions of stainless steel fibers by sintering after making the stainless steel fibers twist together and compressing them. The filtering accuracy can be adjusted by changing its density by changing the thickness of fiber and the degree of compression.

Plasticizer or particles may be previously mixed with resin or may be mixed during the extruder 1. For uniform mixing, the molten article is preferably made to go through a mixer 3 such as a static mixer.

A plurality of raw materials to be subjected to melt extrusion are preferably made into pellets previously by mixing and kneading. Of course, powder raw materials can be supplied to the extruder 1 and be made into a film.

The pelletization may be performed by a known method, and, for example, dried polymers, plasticizers, and other additive agents are supplied to the extruder through a feeding device, mixed and kneaded in a single or double screw extruder, extruded through the die in a strand shape, water-cooled or air-cooled, and cut.

The additive agents may be mixed before being supplied to the extruder, or each additive agent may be supplied with separate feeding device. The particles and a little of additive agent such as antioxidant are preferably mixed beforehand for uniform mixing.

Regarding the extruder for pelletization, the shear force is preferably set low, and the process is preferably performed at as low a temperature as pelletization is possible so that the resin is prevented from being deteriorated (decrease in molecular weight, coloring, gelatification, or the like). For example, when using a double screw extruder, it is preferable to use deep threaded screws and turn them in the same direction. From the point of view of uniform mixing, a mesh type is preferable.

When nipping the film with the first rotation roll 5 and the second rotation roll 6, the temperature of the film on the touch roll side is preferable set at Tg of the film or higher and Tg+110° C. or lower. As a roll having a elastic surface used for such purpose, a known roll can be used. An elastic touch roll is called a rotary pinch member.

When stripping off the film from the first rotation roll 5, the tension is preferably controlled so as to prevent the film from deforming.

The obtained film is preferably stretched in a stretching treatment after going through, if desired, a process in which it is contacted with the second cooling roll 7 and the third cooling roll 8. As the method for stretching, a known stretching device or a tenter is preferably used. In general, the stretching is preferably performed within a temperature range from Tg of the resin constituting the film to Tg+60° C. The both end portions for holding by clips are typically deformed, and they can not be used as a product; thus, they are cut off to be used again.

Before being wound up, the end portions are slit and cut of leaving the width for a product, and the both ends may be subjected to a knurl process (embossing process). As a method for knurling, a method can be employed in which a metal ring having a concavo-convex pattern on its side surface is used with heat or press.

The optical film obtained by the present invention is not specifically limited in thickness but has a film thickness in a range of 10 µm to 200 µm, for example. In particular, the film thickness is preferably 10 µm to 100 µm. More preferably, it is 20 µm to 80 µm. Since the optical film of the present invention is produced by a melt-casting film forming method, it does not contain any solvent after production, and the residual solvent amount is 0.1% by mass or less of the total mass of the optical film. The thickness of the film can be appropriately selected depending on usage.

The optical film preferably has a tension softening point of 105° C. to 145° C. and does not exhibit ductile fracture.

The ductile fracture is defined to be a fracture in which it is caused when a stress larger than strength of a material is created, and the material is extremely stretched or narrowed down until its final fracture.

In a specific method for measuring a tension softening point, by using a tensilon tester (RTC-1225A manufactured by ORIENTEC Co., Ltd.) for example, a film cut out in a shape of 120 mm (length)×10 mm (width) is stretched by a tension of 10 N, and the temperature is kept being raised at a rate of temperature increase 30° C./min; the temperature is measured three times when the tension becomes 9 N; a softening point is obtained from the average value of them.

In addition, the optical film produced by the device for manufacturing an optical film of the present invention preferably has a glass transition temperature (Tg) of 110° C. or higher, more preferably 120° C. or higher, particularly preferably 150° C. or higher.

The glass transition temperature is an intermediate glass transition temperature (Tmg) which is measured by a differential scanning calorimeter (DSC-7 manufactured by Perkin Elmer Inc.) with a temperature increase rate of 20° C./min and obtained according to JIS K7121 (1987).

Further, the optical film produced by the device for manufacturing an optical film of the present invention preferably has a fracture elongation, measured by a measurement according to JIS-K7127-1999, of 10% or more, more preferably 20% or more, in at least one direction.

There is no limitation in the upper limit of the fracture elongation, but it is practically about 250%. In order to increase a fracture elongation, it is effective to control defects in an optical film caused by foreign matters or bubbles.

The optical film produced by the device for manufacturing an optical film of the present invention preferably is a transparent base which has a length of 100 m to 5000 m; a width of 1.2 m or more, more preferably 1.4 m to 4 m; an optical transmittance of 90% or higher, more preferably 93% or higher.

[Film-Constituting-Material]

The material constituting the optical film produced by the device for manufacturing an optical film of the present invention contains at least a thermoplastic resin and may contain, if necessary, additive agents such as plasticizer, antioxidant, oxygen scavenger, light stabilizer, UV absorbent, matte agent, peroxide decomposer, radical scavenger, metal deactivator, dye, and pigment. These materials are properly selected depending on a target which is required characteristics of an optical film.

As a thermoplastic resin, resin conventionally used in the field of optical films can be used, and, for example, a cellulose ester resin, an acrylic or a mixture resin thereof is preferably used. In the present invention, it is more preferable that a cellulose ester resin and an acrylic resin are used together. Using them together improves the workability and the heat resistance of a film. In particular, the above-mentioned tension softening point, glass transition temperature, and fracture elongation of an optical film are accomplished, and ductile-fracture-free characteristics can be obtained.

When using a cellulose ester resin and an acrylic resin, their mixing ratio is 95:5 to 30:70 in mass ratio. Also in this case, the total mass of the cellulose ester resin and the acrylic resin is 55% by mass to 100% by mass of the total film, and preferably 60% by mass to 99% by mass. When using a cellulose ester resin and an acrylic resin, in addition to the below-mentioned cellulose ester resins and acrylic resins, other acrylic resins may be contained.

(Cellulose Ester Resin)

Cellulose ester resins (hereinafter, simply called cellulose esters) are polymers containing a cellulose ester structure, and preferably are single or mixed acid ester containing at least a group selected from fatty acid acyl and substituted or unsubstituted aromatic acyl.

As the cellulose esters, at least one is preferably selected from cellulose acetate, cellulose propionate, cellulose butyrate, cellulose acetate propionate, cellulose acetate butyrate, cellulose acetate phthalate, and cellulose phthalate. Among these, examples of the most preferable cellulose ester include cellulose acetate, cellulose propionate, cellulose butyrate, cellulose acetate propionate and cellulose acetate butyrate.

Regarding a substitution degree of the mixed fatty acid ester, a more preferable lower fatty acid ester of cellulose acetate propionate or cellulose acetate butyrate is a cellulose resin containing a cellulose ester satisfying both the following Relationships I and II, and has acyl groups having two to four carbon atoms as a substituent, where the substitution degree of an acetyl group is X, the substitution degree of a propionyl group or a butyryl group is Y.

$2.6 \leq X+Y \leq 3.0$  Relationship I $0 \leq X \leq 2.5$  Relationship II

Among these, cellulose acetate propionate is especially preferably used, and in particular $1.9 \leq X \leq 2.5$ and $0.1 \leq Y \leq 0.9$ are preferably satisfied. The part which is not substituted by the acyl group is in a state of hydroxyl group. These can be synthesized from raw material cellulose by a known method.

As raw material cellulose for cellulose esters, either of wood pulp or cotton linter can be used, and as for a wood pulp either conifers or broad-leaf frees can be used; however, conifers are more preferable. From the point of view of peelability during film formation, cotton linter is more preferably used. Cellulose esters made of these are used, being properly mixed or alone. For example, they can be used with the mixing ratio of the cellulose ester derived from cotton linter: the cellulose ester derived from wood pulp (conifer): the cellulose ester derived wood pulp (broad-leaf tree) being 100:0:0, 90:10:0, 85:15:0, 50:50:0, 20:80:0, 10:90:0, 0:100:0, 0:0:100, 80:10:10, 85:0:15, or 40:30:30.

The cellulose ester resin used in the present invention preferably has a weight-average molecular weight Mwc of 50,000 to 400,000, more preferably 70,000 to 230,000. Preferably used is the cellulose ester having the ratio of the weight-average molecular weight Mwc to the number average molecular weight Mnc being 1.5 to 5.5, particularly preferably 2.0 to 5.0, more preferably 2.5 to 5.0, and more preferably 3.0 to 5.0.

In this specification, as the weight-average molecular weight and the number average molecular weight, values measured by using a gel permeation chromatography (hereinafter, abbreviated as GPC).

The measurement conditions are as follows.

Solvent: Methylene chloride methren
Column: Shodex K806, K805, K803G (manufactured by SHOWA DENKO K.K., three of them used being connected)
Column temperature: 25° C.
Concentration of sample: 0.1% by mass
Detector: RI Model 504 (manufactured by GL Science Inc.)
Pump: L6000 (manufactured by Hitachi Ltd.)
Flow rate: 1.0 ml/min
Calibration curve: Calibration curve made from 13 samples of Standard polystyrene STK standard polystyrene (manufactured by TOSOH CORPORATION) having Mw of 1,000,000 to 500

The 13 samples are preferably used with equal intervals.

(Acrylic Resin)

The acrylic resin includes methacryl resins. As acrylic resins, there is preferably used a resin made of 50% to 99% by mass of methyl methacrylate units and 1% to 50% by mass of other monomer units copolymerizable with methyl methacrylate.

Examples of other copolymerizable monomers include alkyl methacrylate whose alkyl group has 2 to 18 carbon atoms, alkyl acrylate whose alkyl group has 1 to 18 carbon atoms, $\alpha,\beta$-unsaturated acid such as acrylic acid, methacrylic acid, and the like, an unsaturated group-containing divalent carboxylic acid such as maleic acid, fumaric acid, itaconic acid, and the like, aromatic vinyl compounds such as styrene, $\alpha$-methylstyrene, nuclear-substituted styrene, and the like, $\alpha,\beta$-unsaturated nitrile suh as acrylonitrile, methacrylonitrile, and the like, maleic anhydride, maleimide, N-substituted maleimide, glutaric acid anhydride, and the like. These can be used alone or in combination of two or more.

Among these, from the point of view of thermal degradation resistance and fluidity of copolymer, preferred is alkyl acrylate having a carbon number of alkyl number of 1 to 8 including methyl acrylate, ethyl acrylate, n-propyl acrylate, n-butyl acrylate, s-butyl acrylate, 2-ethylhexyl acrylate, and the like, and in particular methyl acrylate and n-butyl acrylate are preferably used.

There is no specific limitation to a method for manufacturing acrylic resin, and any of known methods can be used, including suspension polymerization, emulsion polymerization, bulk polymerization, solution polymerization, and the like. The polymeric initiator may normally be peroxide based or azo based, and alternatively be redox based. The polymerization can be performed at 30° C. to 100° C. for suspension polymerization, and at 80° C. to 160° C. for emulsion polymerization. In addition, in order to control a reduced viscosity of the produced polymer, polymerization can be performed using alkyl mercaptan or the like as a chain-transfer agent. Having a predetermined molecular weight can strike a balance between heat resistance and brittleness.

Commercially available acrylic resins can be used. Examples include Delpet 60N, 80N (manufactured by Asahi Kasei Corporation), DIANAL BR52, BR80, BR83, BR85, BR88 (manufactured by Mitsubishi Rayon Co., Ltd.), KT75 (manufactured by DENKI KAGAKU KOGYO KABUSHIKI KAISHA) and the like.

Acrylic resins are preferably prepared by mixing two or more types of acrylic resins having different weight-average molecular weights. Such two or more types of acrylic resins preferably have the same composition (constituent monomers). The number of types of acrylic resins to be mixed is not specifically limited, but preferably is 10 or less as a viable range. For example, acrylic resins having different monomer composition of 20% by mass or less are regarded as the same acrylic resin.

In the present invention, acrylic resins having a weight-average molecular weight Mwa of 10,000 to 300,000 are preferably used. In the case of mixing and using two or more types of acrylic resins having different weight-average molecular weights, any arbitrary combination of two or more types of acrylic resin can be used, for example, mixing acrylic resins having weight-average molecular weights of 10,000 and 5,000,000. Mwa represents the weight-average molecular weight of acrylic resin having been mixed.

Mwc of cellulose ester resins and Mwa of acrylic resins preferably satisfy the relationship of Mwc>Mwa. The acrylic resins having a higher weight-average molecular weight have a lower extrusion capability due to a higher melt viscosity. If the melting temperature is raised in order to lower the melt viscosity, the deterioration of cellulose ester resins to be mixed is facilitated. To the contrary, if the molecular weights of cellulose ester resins are lowered, the brittleness inherent to acrylic resins is raised, and thereby lowering the machining capability in producing a polarizer because the film becomes brittle. By setting the weight-average molecular weight Mwc of cellulose ester resins larger than the weight-average molecular weight Mwa of acrylic resins, the design is well balanced.

The value of Mw/Mn of molecular weight distributions of acrylic resins to be used in the present invention is preferably 2.3 to 6.0, more preferably 2.5 to 4.5. In general, acrylic resins having a higher average molecular weight have larger Mw/Mn; however, by mixing at least two types of acrylic resins having a relatively high molecular weight and a relatively low molecular weight, there can be obtained Mw/Mn larger than each Mw/Mn before mixing. Further, by a known method for polymer synthesis, each can be independently designed. In the present invention, two or more types of acrylic resins having different weight-average molecular weights are preferably mixed and used in order to increase Mw/Mn.

Mwc/Mnc of cellulose ester resins and Mwa/Mna of acrylic resins preferably satisfy the relationship Mwa/Mna>Mwc/Mnc. Smaller Mwa/Mna lowers the strength of hard coat. In addition, larger Mwc/Mnc facilitates the deterioration of resin when melted. As a result, it is preferable for the relationship Mwa/Mna>Mwc/Mnc to be satisfied in order to strike a balance between them.

The most preferable relationship in the present invention between cellulose ester resins and crylic resins is that the acrylic resin having a smaller molecular weight has a larger molecular weight distribution than the cellulose ester resin.

(Plasticizer)

Compounds known as plasticizers are preferably added from the point of view of improving the characteristics of the film, for example, improving mechanical properties, adding flexibility, adding water absorption resistance, and reducing transmittance of water.

As plasticizers, there are preferably used, for example, phosphoric acid ester derivatives and carboxylic acid ester derivatives. Alternatively, as described in Japanese Laid-Open Patent Application Publication No. 2003-12859, there are preferably used polymer and acrylic polymer produced by polymerizing unsaturated ethylene monomers having a weight-average molecular weight of 500 or more and 10,000 or less, acrylic polymers having an aromatic ring in its side chain, acrylic polymers having a cyclohexyl group in its side chain, or the like.

Examples of specific plasticizers include phosphoric acid ester based plasticizers, ethylene glycol ester based plasticizers, glycerin ester based plasticizers, diglycerin ester based plasticizers (fatty acids), polyhydric alcohol ester based plasticizers, carboxylic acid ester based plasticizers, polyhydric carboxylic acid ester based plasticizers, polymer plasticizers, and the like. Among these, preferred are polyhydric alcohol ester based plasticizers, carboxylic acid ester based plasticizers, and polyhydric carboxylic acid ester based plasticizers.

Plasticizer may be liquid or solid, and is preferably colorless due to the limitation of constituents. It is preferable to be thermally stable at high temperatures, and the kickoff temperature is preferably 150° C. or higher, and more preferably 200° C. or higher. The amount of addition is not limited as long as it does not adversely affects the optical characteristics or mechanical properties, and the amount of composition is selected in a range which does not impair an object of the present invention. It is preferably 0.001 parts by mass to 50 parts by mass, more preferably 0.01 parts by mass to 30 parts by mass, and particularly preferably 0.1 parts by mass to 15 parts by mass.

The specific examples of plasticizers include, but not limited to, the followings.

Phosphoric acid ester based plasticizers include, in particular, phosphoric acid alkyl esters such as tricresyl phosphate and tributyl phosphate, phosphoric acid cycloalkyl esters such as tricyclopentyl phosphate and cyclohexyl phosphate, and phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphthyl phosphate, trixylyl phosphate, and tris ortho-biphenyl phosphate. These substituent groups may be the same, different, or further substituted. Further, they may be a mixture of alkyl groups, cycloalkyl groups, and allyl groups, or these substituents may be covalent bonded to each other.

In addition, examples include phosphoric acid esters alkylene bis(dialkyl phosphate) such as alkylene his (dimethyl phosphate) and butylene his (diethyl phosphate), alkylene bis(diaryl phosphate) such as alkylene his (diphenyl phosphate) and propylene bis(dinaphthyl phosphate), arylene bis phosphate) such as phenylene bis(dibutyl phosphate) and biphenylene bis(dioctyll)phosphate), arylene bis(diaryl phosphate) such as phenylene bis(diphenyl phosphate) and naphthylene his (ditriyl phosphate), and the like. These substituent groups may be the same or different, or may be further substituted. Further, they may be a mixture of alkyl groups, cycloalkyl groups, or allyl groups, or these substituent groups may be covalent bonded to each other.

In addition, a partial structure of phosphoric acid ester may be a part of polymer or may be regularly pendanted or introduced into a part of molecular structures of additive agent such as antioxidant, acid scavenger, and UV absorbent.

Among the above compounds, phosphoric acid aryl ester and arylene his (diaryl phosphate) are preferable, and in particular, triphenyl phosphate and phenylene bis(diphenyl phosphate) are preferable.

Ethylene glycol ester based plasticizers include, in particular, ethylene glycol alkyl ester based plasticizers such as ethylene glycol diacetate and ethylene glycol dibutylate, ethylene glycol cycloalkyl ester based plasticizers such as ethylene glycol dicyclopropyl carboxylate, ethylene glycol dicyclohexyl carboxylate, and ethylene glycol aryl ester based plasticizers such as ethylene glycol dibenzoate and ethylene glycol di-4-methyl benzoate. These alkylate groups, cycloalkylate groups, and arylate groups may be the same or different, or may be further substituted. Further, they may be a mixture of alkylate groups, cycloalkylate groups, of arylate groups, or these substituent groups may be covalent bond to each other. In addition, ethylene glycol part may be substituted, and a partial structure of ethylene glycol ester may be a part of polymer or regularly pendanted, or may be introduced into a part of a molecular structure of additive agent such as antioxidant, acid scavenger, and UV absorbent.

Examples of glycerin ester based plasticizers include, in particular, glycerin alkyl esters such as triacetin, tributyrin, glycerin diacetate caprylate, and glycerin oleate propionate, glycerin cycloalkyl esters such as glycerin tricyclopropyl carboxylate and glycerin tri cyclo hexyl carboxylate, glycerin aryl esters such as glycerin tribenzoate and glycerin 4-methyl benzoate, diglycerin alkyl esters such as diglycerin tetralaurate, diglycerin tetrapropionate, diglycerin acetate tricaprylate, and diglycerin tetralaurate, diglycerin cycloalkyl esters such as diglyceline tetracyclobutyl carboxylate and diglycerin tetracyclopentyl carboxylate, diglycerin aryl esters such as diglycerin tetra benzoate and diglycerin 3-methylbenzoate, and the like. These alkylate groups, cycloalkyl carboxylate groups, and arylate groups may be the same or different, or may be further substituted. Further, they may be a mixture of alkylate groups, cycloalkyl carboxylate groups, or arylate groups, or these substituent groups may be covalent bonded to each other. In addition, glycerin part and diglycerin part may be substituted, and a partial structure of glycerin ester and diglycerin ester may be a part of polymer or regularly pendanted or may be introduced into a part of a molecular structure of additive agent such as antioxidant, acid scavenger, and UV absorbent.

Examples of polyhydric alcohol ester plasticizers include, in particular, the below-mentioned polyhydric alcohol ester based plasticizers.

[Chemical Formula 1]

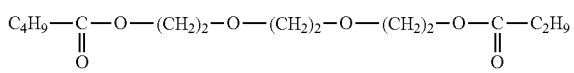

1

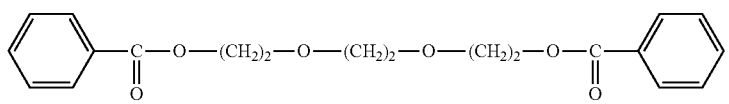

2

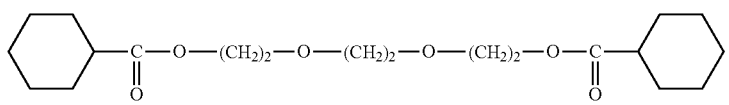

3

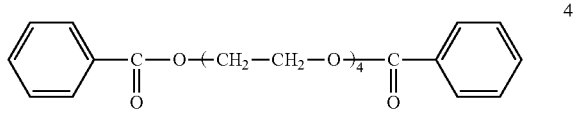

4

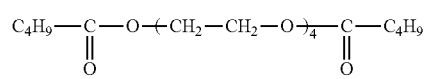

5

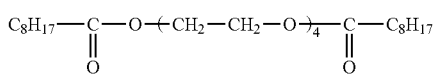

6

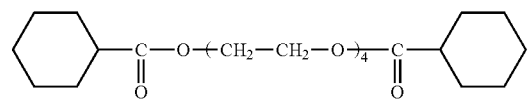

7

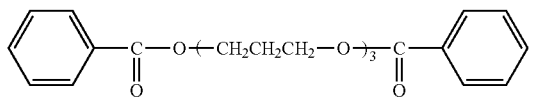

8

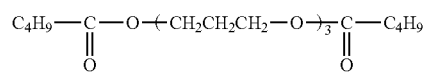

9

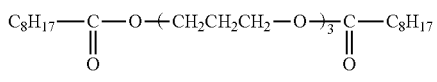

10

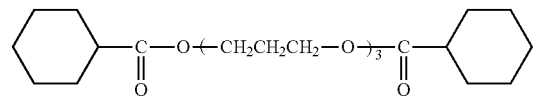

11

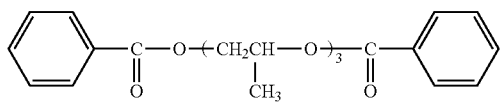

12

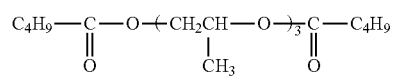

13

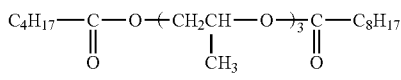

14

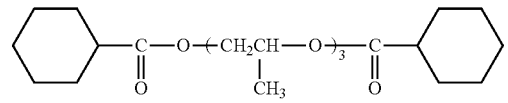

15

-continued
[Chemical Formula 2]
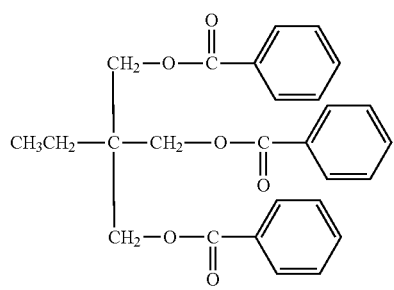
16
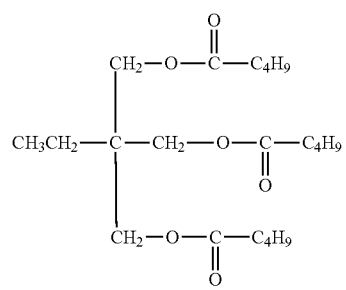
17
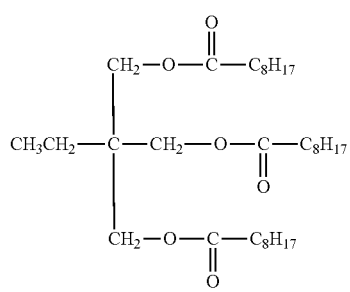
18
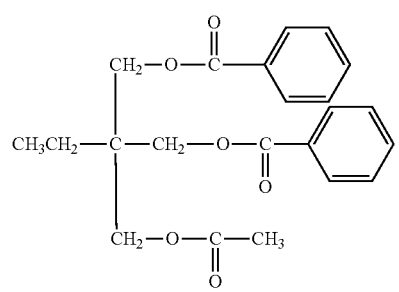
19
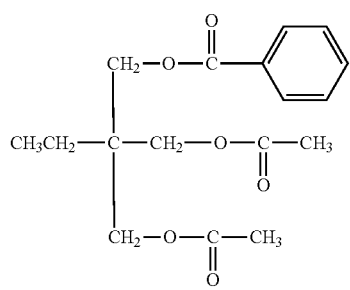
20
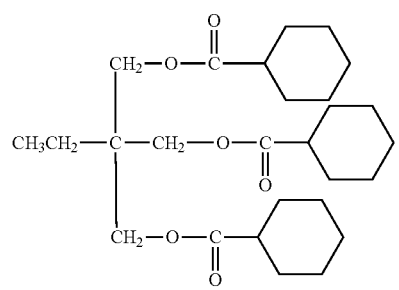
21
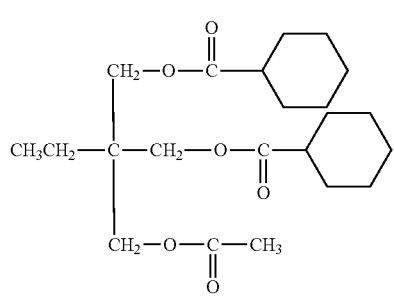
22
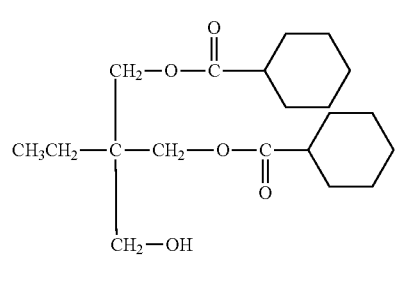
23

[Chemical Formula 3]
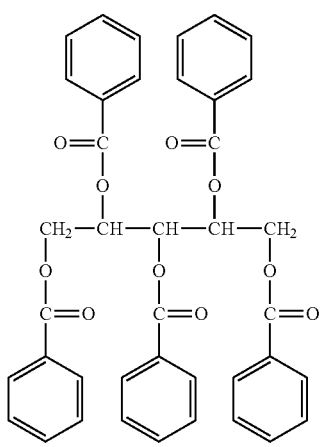
24
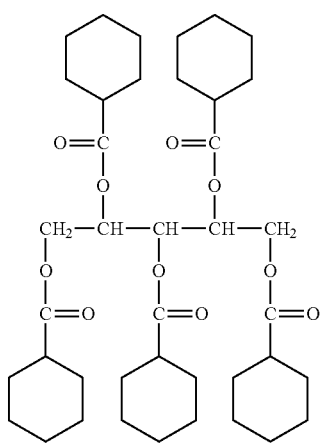
25
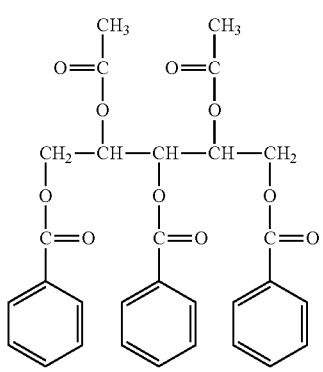
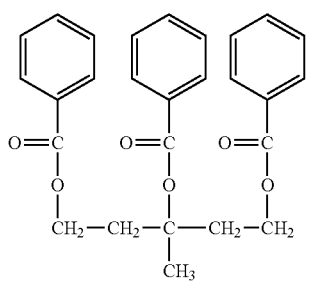
26
27
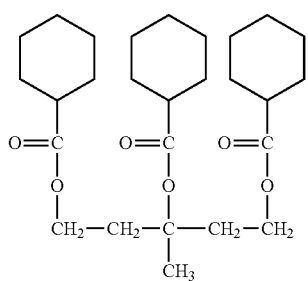
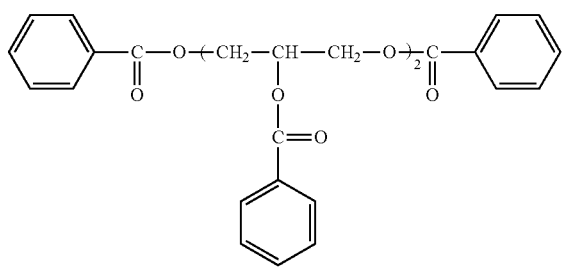
28
29
[Chemical Formula 4]
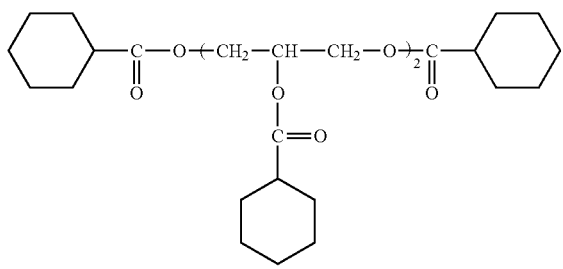
30

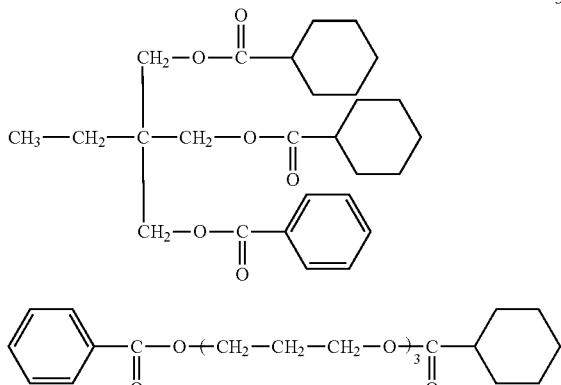

31

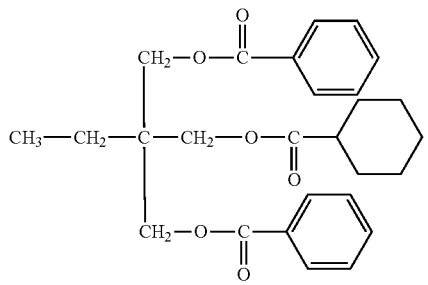

32

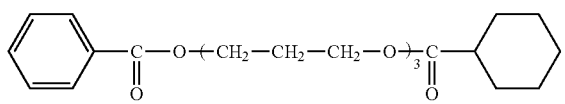

33

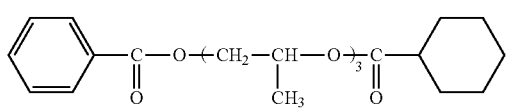

34

35

30

These alkylate groups, cycloalkyl carboxylate groups, and arylate groups may be the same or different, or may be further substituted. Further, they may be a mixture of alkylate groups, cycloalkyl carboxylate groups, or arylate groups, or these substituents may be covalent bonded to each other. In addition, polyhydric alcohol part may be substituted, or a partial structure of polyhydric alcohol may be a port of polymer or regularly pendanted, or may be introduced into a part of a molecular structure of additive agent such as antioxidant, acid scavenger, and UV absorbent.

Examples of carboxylic acid ester based plasticizers include, in particular, alkyl dicarboxylic acid alkyl ester based plasticizers such as didodecyl moranate (C1), dioctyl adipate (C4), and dibutyl sebacate (C8), alkyl dicarboxylic acid cycloalkyl ester based plasticizers such as dicyclopentyl succinate and dicyclohexyl adipat, alkyl dicarboxylic acid aryl ester based plasticizers such as diphenyl succinate and di-4-methyl phenyl glutarate, cycloalkyl dicarboxylic acid cycloalkyl dicarboxylic acid alkyl ester based plasticizers such as dihexyl 1,4-cyclohexane dicarboxylate and didecyl-bicyclo[2.2.1]heptane-2,3-dicarboxylate, cycloalkyl dicarboxylic acid cycloalkyl ester based plasticizers such as dicyclohexyl 1,2-cyclobutane dicarboxylate and dicyclopropyl-1,2-cyclohexyl dicarboxylate, cycloalkyl dicarboxylic acid aryl ester based plasticizers such as diphenyl-1,1-cyclopropyl dicarboxylate and di-2-naphthyl 1,4 cyclohexane dicarboxylate, aryl dicarboxylic acid alkyl ester based plasticizers such as diethyl phthalate, dimethyl phthalate, dioctyl phthalate, dibutyl phthalate, and di-2-ethyl hexyl phthalate, aryl dicarboxylic acid cycloalkyl ester based plasticizers such as dicyclopropyl phthalate and dicyclohexyl phthalate, and aryl dicarboxylic acid aryl ester based plasticizers such as diphenyl phthalate and di-4-methyl phenyl phthalate. These alkoxy groups and cycloalkoxy groups may be the same or different, or these substituents may be further substituted. Alkyl groups and cycloalkyl groups may be a mixture, or these substituents may be covalent bonded to each other. Further, the aromatic ring of phthalic acids may be substituted, or may be a polymer form of dimer, timer, or tetramer. In addition, a partial structure of phthalic acid esters may be a part of polymer or regularly pendanted to polymer, or may be introduced into a part of a molecular structure of additive agent such as antioxidant, acid scavenger, and UV absorbent.

Examples of polyhydric carboxylic acid ester based plasticizers, in particular, the followings: alkyl polyhydric carboxylic acid alkyl ester based plasticizers such as tridodecyl tricarbalate and tributyl-meso-butane 1,2,3,4-tetracarboxylate; alkyl polyhydric carboxylic acid cycloalkyl ester based plasticizers such as tricyclohexyl tricarbalate and tricyclopropyl-2-hydroxyl-1,2,3-propane tricarboxylate; alkyl polyhydric carboxylic acid aryl ester based plasticizers such as triphenyl 2-hydroxyl-1,2,3-propane tricarboxylate and tetra 3-methyl phenyl tetrahydrofuran-2,3,4,5-tetracarboxylate; cycloalkyl polyhydric carboxylic acid alkyl ester based plasticizers such as tetrahexyl-1,2,3,4-cyclobutane tetracarboxylate and tetrabutyl-1,2,3,4-dicyclopentane tetracarboxylate; cycloalkyl polyhydric carboxylic acid cycloalkyl ester based plasticizers such as tetracyclopropyl-1,2,3,4-cyclobutane tetracarboxylate and tricyclohexyl-1,3,5-cyclhexyl tricarboxylate; cycloalkyl polyhydric carboxylic acid aryl ester based plasticizers such as triphenyl-1,3,5-cyclohexyl tricarboxylate and hexa 4-methylphenyl-1,2,3,4,5,6-cyclohexyl hexacarboxylate hexyl hexacarboxylate; aryl polyhydric carboxylic acid alkyl ester based plasticizers plasticizers such as tridodecyl benzene-1,2,4-tricarboxylate and tetraoctyl benzene-1,2,4,5-tetracarboxylate; aryl polyhydric carboxylic acid cycloalkyl ester based plasticizers such as tricyclopentyl benzene-1,3,5-tricarboxylate and tetracyclohexyl benzene-1,2,3,5-tetracarboxylate; and aryl polyhydric carboxylic acid aryl ester based plasticizers such as triphenyl benzene-1,3,5-tetracarboxylate and hexa 4-methylphenyl benzene-1,2,3,4,5,6-hexacarboxylate. These alkoxy groups and cycloalkoxy groups may be the same or different, or may be substituted, or these substituents may be further substituted. Alkyl groups and cycloalkyl groups may be a mixture, or these substituent grouops may be covalent bonded to each other. Further, an aromatic ring of phthalic acid may be substituted, or polymer form such as dimer, trimer, or tetramer. In addition, a partial structure of phthalic acid ester may be a part of polymer or regularly pendanted to polymer, or may be introduced into a part of a molecular structure of additive agent such as antioxidant, acid scavenger, and UV absorbent.

Examples of olymer plasticizers include, in particular, acrylic polymers such as aliphatic hydrocarbon based polymers, alicyclic hydrocarbon based polymers, polyethyl acrylate, and polymethyl methacrylate, vinyl based polymers such as polyvinyl isobutyl ether and poly N-vinyl pyrrolidone, styrene based polymers such as polystyrene and poly 4-hydroxystyren, polyesters such as polybutylene succinate, polyethylene terephthalate, and polyethylene naphthalate, polyethers such as polyethylene oxide and polypropylene oxide, polyamide, polyurethane, and polyurea. Polymer plasticizer preferably has a number average molecular weight of 1,000 to 500,000, specifically preferably 5,000 to 200,000. If it is 1,000 or less, there is a problem with volatility. If it is more than 500,000, plasticizing ability decreases, thereby adversely affecting the mechanical properties of derivative composition of cellulose ester. These polymer plasticizers may be homopolymer made up of one repeat unit or copolymer having a plurality of repeat units. Two or more of the above polymers may be used together.

Among the above plasticizers, preferred is one which generates volatile substance while being thermally melted. In particular, non-volatile phosphoric acid esters described in Japanese Translation of PCT International Application Publication H6-501040 are exemplified, and arylene bis(diaryl phosphate) esters and trimethylol propane tribenzoate, etc. in the above exemplified compounds are preferable, for example, but are not limited thereto.

Regarding plasticizer, 0.5 parts by mass to 50 parts by mass are preferably added with respect to 100 parts by mass or thermoplastic resin, 1 part by mass to 30 parts by mass is more preferable, and 1 part by mass to 15 parts by mass is still more preferable.

(Antioxidant)

Examples o antioxidant include phenol based antioxidants, phosphorus based antioxidants, sulfur based antioxidants, heat-resistance-treatment stabilizing agents, oxygen scavengers, and the like. Among these, preferred are phenol based antioxidants, especially alkyl substituted phenol based antioxidants. More preferable antioxidants are hindered phenol compounds.

Addition of antioxidants prevents a molded article from being colored and deterioration of strength due to the heat for molding, oxidative degradation, or the like without decreasing heat resistance and the like. Antioxidant can be used alone or in combination of two types or more, and the amount of addition is properly selected unless the object is impaired, and the preferable amount is 0.001 parts by mass to 5 parts by mass with respect to 100 parts by mass of thermoplastic resin, and the more preferably is 0.01 parts by mass to 1 part by mass.

Hindered phenol based antioxidant compounds are known compounds and described in, for example, U.S. Pat. No. 4,839,405, columns 12 to 14 and include 2,6-dialkylphenol derivative compound.

Specific examples of hindered phenol compounds include: n-octadecyl=3-(3,5-di-t-butyl-4-hydroxyphenyl)-propionate, n-octadecyl=3-(3,5-di-t-butyl-4-hydroxyphenyl)-acetate, n-octadecyl=3,5-di-t-butyl-4-hydroxybenzoate, n-hexyl=3,5-di-t-butyl-4-hydroxyphenyl benzoate, n-dodecyl=3,5-di-t-butyl-4-hydroxyphenyl benzoate, neo-dodecyl=3-(3,5-di-t-butyl-4-hydroxyphenyl)propionate, dodecyl=β(3,5-di-t-butyl-4-hydroxyphenyl)propionate, ethyl=α-(4-hydroxy-3,5-di-t-butyl phenyl)isobutyrate, octadecyl=α-(4-hydroxy-3,5-di-t-butyl phenyl)isobutyrate, octadecyl=α-(4-hydroxy-3,5-di-t-butyl-4-hydroxyphenyl) propionate, 2-(n-octylthio)ethyl=3,5-di-t-butyl-4-hydroxybenzoate, 2-(n-octylthio)ethyl=3,5-di-t-butyl-4-hydroxyphenyl acetate, 2-(n-octadecylthio)ethyl=3,5-di-t-butyl-4-hydroxyphenyl acetate, 2-(n-octadecylthio)ethyl=3,5-di-t-butyl-4-hydroxy-benzoate, 2-(2-hydroxyethylthio)ethyl=3,5-di-t-butyl-4-hydroxybenzoate, diethyl glycol=bis-(3,5-di-t-butyl-4-hydroxy-phenyl)propionate, 2-(n-octadecylthio)ethyl=3-(3,5-di-t-butyl-4-hydroxyphenyl)propionate, stearamide-N,N-bis-[ethylene=3-(3,5-di-t-butyl-4-hydroxyphenyl)propionate], n-butyl imino-N,N-bis-[ethylene=3-(3, 5-di-t-butyl-4-hydroxyphenyl)propionate], 2-(2-stearoyl ethylthio)ethyl=3,5-di-t-butyl-4-hydroxybenzoate, 2-(2-stearoyl ethylthio)ethyl=7-(3-methyl-5-t-butyl-4-hydroxyphenyl)heptanoate, 1,2-propylene glycol=bis-[3-(3, 5-di-t-butyl-4-hydroxyphenyl)propionate], ethylene glycol=bis-[3-(3,5-di-t-butyl-4-hydroxyphenyl)propionate], neopentyl glycol=bis-[3-(3,5-di-t-butyl-4-hydroxyphenyl) propionate], ethylene glycol=bis-(3,5-di-t-butyl-4-hydroxyphenyl acetate), glycerin-1-n-octadecanoate-2,3-bis-(3,5-di-t-butyl-4-hydroxyphenyl acetate), pentaerythritol-tetrakis-[3-(3',5'-di-t-butyl-4'-hydroxyphenyl)propionate], 1,1,1-trimethylolethane-tris-[3-(3,5-di-t-butyl-4-hydroxyphenyl)propionate], sorbitolhexa-[3-(3,5-di-t-butyl-4-hydroxyphenyl)propionate], 2-hydroxyethyl=7-(3-methyl-5-t-butyl-4-hydroxyphenyl)propionate, 2-stearoyl ethyl=7-(3-methyl-5-t-butyl-4-hydroxyphenyl)heptanoate, 1,6-n-hexane diol-bis[(3',5'-di-t-butyl-4-hydroxyphenyl) propionate], and pentaerythritol-tetrakis(3,5-di-t-butyl-4-hydroxyhydrocinnamate).

Hindered phenol based antioxidants of the above types are available on the market with the product names of Irgano x1076 and "Irgano x1010" from BASF Japan Ltd., for example.

Examples of other types of antioxidants include, in particular: phosphorus based antioxidants such as tris nonyl phenyl phosphite, triphenyl phosphite, and iris (2,4-di-tert-butyl phenyl)phosphite; sulfur based antioxidants such as dilauryl-3, 3'-thiodipropionate, dimyristyl-3,3'-thiodipropionate, distearyl-3,3'-thiodipropionate, and pentaerythrityl tetrakis(3-laurylthiopropionate); heat-resistance-treatment stabilizing agents such as 2-tert-butyl-6-(3-tert-butyl-2-hydroxy-5-methyl benzil)-4-methyl phenyl acrylate, and 2-[1-(2-hydroxy-3,5-di-tert-pentyl phenyl)ethyl]-4,6-di-tert-pentyl phenyl acrylate; 3,4-dihydro-2H-1-benzopyran based compound, 3,3'-spirodichroman based compound, 1,1-spiroindan based compound, morpholine, thiomorpholine, thiomorpholine dioxide, and thiomorpholine didioxide described in Examined Japanese Patent Application Publication No. H08-27508; compounds having a piperazine structure as a partial structure; and oxygen scavengers such as dialkoxy benzene based compound described in Japanese Laid-Open Patent Application Publication No. H3-174150.

Antioxidants may have a partial structure as a part of polymer, or maybe regularly pendanted to polymer.

(Oxygen Scavenger)

As useful oxygen scavenger, any compounds which inactiavates acid by reacting with the acid can be used without any limitation, and compounds which have epoxy groups and are described in U.S. Pat. No. 4,137,201 are preferable. Such epoxy compounds to be used as oxygen scavengers are known in the technical field, and examples include, many types of diglycidyl ethers of polyglycol, especially metallic epoxy compound, for example, compounds which have been conventionally used in vinyl chloride polymer compositions and used together with vinyl chloride polymer compositions, such as polyglycol, which is derived by condensing about 8 to 40 moles of ethylene dioxide with respect to one mole of polyglycol, and adiglycidyl ether of glycerol; epoxidized ether condensation products; diglycidyl ether (that is, 4,4'-dihydroxy diphenyl dimethyl methane) of bisphenol A; epoxidized unsaturated fatty acid ester (especially, esters of alkyl of 4 to 2 carbon atoms of fatty acids having 2 to 22 carbon atoms, for example, butyl epoxy stearat, and the like); epoxidized vegetable oils represented by compositions such as many types of epoxidized long-chain fatty acid triglycerides (for example, epoxidized soybean oil and the like); and unsaturated natural oils, which are called as epoxidized natural glycerides or unsaturated fatty acids and have 12 to 22 carbon atoms. In addition, commercially available epoxide resin compound EPON 815C is preferably used.

Examples of usable oxygen scavengers other than the above include, oxetane compounds, oxazoline compounds, organic acid salts of alkali earth metals, acetylacetonato complexes, and ones described in paragraphs 0068-0105 of Japanese Laid-Open Patent Application Publication No. H5-194788.

Oxygen scavengers are also called as acid scavengers, acid tripping agents, or acid catchers, but they can be used regardless of their names, in the present invention.

(Light Stabilizer)

Examples of light stabilizers include hindered amine light stabilizer (HALS) compounds, which are known compound and contain 2,2,6,6-tetraalkyl piperidine compound or acid-added salt of it, or alternately complexes of the acid-added salt and metallic compound as described in, for example, columns 5-11 of U.S. Pat. No. 4,619,956 and columns 3-5 of U.S. Pat. No. 4,839,405.

Specific example of hindered amine light stabilizer compounds include 4-hydroxy-2,2,6,6-tetramethyl piperidine, 1-aryl-4-hydroxy-2,2,6,6-tetramethyl piperidine, 1-benzil-4-hydroxy-2,2,6,6-tetramethyl piperidine, 1-(4-t-butyl-2-butenyl)-4-hydroxy-2,2,6,6-tetramethyl piperidine, 4-stearoyl-2,2,6,6-tetramethyl piperidine, 1-ethyl-4-salicyloyloxy-2,2,6,6-tetramethyl piperidine, 4-methacryloyloxy-1,2,2,6,6-pentamethyl piperidine, 1,2,2,6,6-pentamethyl piperidine-4-yl-β(3,5-di-t-butyl-4-hydroxyphenyl)-propionate, 1-benzil-2,2,6,6-tetramethyl-4-piperidinyl maleinate (maleinate), (di-2,2,6,6-tetramethyl piperidine-4-yl)-adipate, (di-2,2,6,6-tetramethyl piperidine-4-yl)-adipate, (di-1,2,3,6-tetramethyl-2,6-diethyl-piperidine-4-yl)-adipate, (di-1-aryl-2,2,6,6-tetramethyl-piperidine-4-yl)-phthalate, 1-acetyl-2,2,6,6-tetramethyl piperidine-4-yl-acetate, trimellitic acid-tri-(2,2,6,6-tetramethyl piperidine-4-yl)ester, 1-acryloyl-4-benzil oxy-2,2,6,6-tetramethyl piperidine, dibutyl-di-(1,2,2,6,6-pentamethyl-piperidine-4-yl)-ester, dibenzil-malonic acid-di-(1,2,3,6-tetramethyl-2,6-diethyl-piperidine-4-yl)-ester, dimethyl-bis-(2,2,6,6-tetramethyl piperidine-4-oxy)-silane, tris-(1-propyl-2,2,6,6-tetramethyl piperidine-4-yl)-phosphite, tris-(1-propyl-2,2,6,6-tetramethyl piperidine-4-yl)-phosphate, N,N'-bis-(2,2,6,6-tetramethyl piperidine-4-yl)-hexamethylene-1,6-diamine, N,N'-bis-(2,2,6,6-tetramethyl piperidine-4-yl)hexamethylene-1,6-diacetamide, 1-acetyl-4-(N-cyclohexyl acetamide)-2,2,6,6-tetramethyl-piperidine, 4-benzil amino-2,2,6,6-tetramethyl piperidine, N,N'-bis-(2,2,6,6-tetramethyl piperidine-4-yl)-N,N'-dibutyl adipamide, N,N'-bis-(2,2,6,6-tetramethyl piperidine-4-yl)-N,N'-dicyclohexyl (2-hydroxypropylene), N,N'-bis-(2,2,6,6-tetramethyl piperidine-4-yl)-p-xylylenediamine, 4-(bis-2-hydroxyethyl)-amino-1,2,2,6,6-pentamethyl piperidine, 4-methacrylamide-1,2,2,6,6-pentamethyl piperidine, and α-cyano-β-methyl-β-[N-(2,2,6,6-tetramethyl piperidine-4-yl)]-amino-acrylic acid methyl ester. At least one or more of light stabilizers may be selected.

The amount of light stabilizers to be added is preferably 0.001 parts by mass or more and 5 parts by mass or less with respect to 100 parts by mass of thermoplastic resin, more preferably is 0.005 parts by mass or more and 3 parts by mass or less, and still more preferably is 0.01 parts by mass or more and 0.8 parts by mass or less.

(UV Absorbent)

When an optical film is used on the observation side of a liquid crystal cell as a protection film of a polarizer, UV absorbent is preferably additionally added.

UV absorbents are effective to prevent the film-constituting materials from degrading due to ultraviolet in the environment of usage after having been manufactured. Cellulose esters themselves are relatively resistant to ultraviolet, but some additive agents other than that may be susceptible compounds to ultraviolet. Polarizers and liquid crystal cells are susceptible to ultraviolet. Therefore, it is preferable that UV absorbent is contained in at least one polarizer protection film on the side into which outside light comes and on the side which the backlight for a liquid crystal display enters.

UV absorbents preferably have a excellent absorbing ability of ultraviolet of wavelengths 370 nm and shorter from the point of view of prevention of degradation of polarizers and a display device due to ultraviolet, and do not absorb much visible lights of wavelengths 400 nm and longer from the point of view of display properties of the liquid crystal. Examples include oxybenzophenone based compounds, benzotriazole based compounds, triazine based compounds, salicylic acid ester based compounds, benzophenone based compounds, cyano acrylate based compounds, nickel complex salt based compounds; and preferable are benzophenone based compounds and benzotriazole based compounds, which are less colored; and specifically preferable are benzotriazole based compounds. UV absorbents described in Japanese Laid-Open Patent Application Publications No. H10-182621 and No. H8-337574 may be used, or polymer UV absorbent described in Japanese Laid-Open Patent Application Publication No. H6-148430 may be used.

Specific example of benzotriazole based UV absorbents include, but are not limited to, 2-(2'-hydroxy-5'-methyl phenyl)benzotriazole, 2-(2'-hydroxy-3',5'-di-tert-butyl phenyl) benzotriazole, 2-(2'-hydroxy-3'-tert-butyl-5'-methyl phenyl) benzotriazole, 2-(2'-hydroxy-3',5'-di-tert-butyl phenyl)-5-chlorobenzotriazole, 2-(2'-hydroxy-3'-(3'',4'',5'',6''-tetrahydro phthalimide methyl)-5'-methyl phenyl) benzotriazole, 2,2-methylenebis(4-(1,1,3,3-tetramethyl butyl)-6-(2H-benzotriazole-2-yl)phenol), 2-(2'-hydroxy-3'-tert-butyl-5'-methyl phenyl)-5-chlorobenzotriazole, 2-(2H-benzotriazole-2-yl)-6-(straight chain and side chain dodecyl)-4-methyl phenol, and a mixture of octyl-3-[3-tert-butyl-4-hydroxy-5-(chloro-2H-benzotriazole-2-yl)phenyl] propionate and 2-ethyl hexyl-3-[3-tert-butyl-4-hydroxy-5-(5-chloro-2H-benzotriazole-2-yl)phenyl]propionate.

Specific examples of benzophenone based compounds include, but are not limited to, 2,4-dihydroxybenzophenone, 2,2'-dihydroxy-4-methoxy benzophenone, 2-hydroxy-4-methoxy-5-sulfobenzophenone, bis(2-methoxy-4-hydroxy-5-benzoyl phenyl)methane, and the like.

Commercially available UV absorbents TINUVIN 109, TINUVIN 171, TINUVIN 234, or TINUVIN 360 (each manufactured by BASF Japan Ltd.) can be used.

UV absorbents of 0.1 parts by mass to 20 parts by mass are preferably added with respect to 100 parts by mass of thermoplastic resin, more preferably 0.5 parts by mass to 10 parts by mass, and still more preferably 1 part by mass to 5 parts by mass. Two or more of these may be used together.

(Matte Agent)

In order to provide slipperiness, fine particles such as matte agents can be added, and examples of fine particles include fine particles of inorganic compound or organic compound. As matte agents, the smallest possible particles are preferable, and examples of fine particles include inorganic fine particles such as silicon dioxide, titanium dioxide, aluminum oxide, zirconium oxide, calcium carbonate, kaolin, talc, baked calcium silicate, hydrous calcium silicate, aluminum silicate, magnesium silicate, and calcium phosphate and crosslinked polymer fine particles. Among these, silicon dioxide is preferably because it lowers haze of a film. Fine particles made of for example, silicon dioxide are often surface-treated with organic substance in many cases, and such particles are preferable because they decrease the haze of a film. Example of preferred organic substances for surface treatment include halosilanes, alkoxysilanes, silazane, siloxan, and the like.

Matte agents with a larger average particle diameter realize higher slipperiness, and those with a smaller average particle diameter realize higher transparency. The secondary particles of matte agent fine particles have an average particle diameter in a range of 0.05 μm to 1.0 μm. The average particle diameter of matte agent fine particles is preferably 5-50 nm, and more preferably is 7 nm to 14 nm. These matte agent fine particles are preferably used to generate irregularity of 0.01 μm to 1.0 μm on the surface of a film.

Examples of silicon dioxide fine particles include AEROSIL 200, 200V, 300, R972, R972V, R974, R202, R812, OX50, TT600, and the like manufactured by Nippon Aerosil Co., Ltd., and preferable are AEROSIL 200V, R972, R972V, R974, R202, and R812.

Two of more types of matte agents may be used together. When using two or more types together, a mixture at an arbitrarily ratio can be used. In this case, fine particles different in average particle diameters and materials, for example, AEROSIL 200V and R972V are used at a mass ratio of 0.1:99.9 to 99.9:0.1.

Another purpose of the existence of the fine particles used as matte agent in a film is to increase the strength of the film.

Matte agent is preferably added in an amount of 0.005 parts by mass to 0.3 parts by mass with respect to 100 parts by mass of thermoplastic resin.

EXAMPLE

Example 1

Preparation of Pellets

Regarding cellulose ester resin, the below-described cellulose ester C-1 was used.

C-1: CAP482-20 (manufactured by Eastman Chemical Company); Weight-average molecular weight 221,000; Mw/Mn=3.5; Substitution degree of acetyl group X=0.1; Substitution degree of propionyl group or butyryl group Y=2.5.

Regarding acrylic resin, acrylic resin A-1 was used, which was prepared by mixing acrylic resins 1 to 3 listed in Table 1 and was made up of polymer (methyl methacrylate: methyl acrylate)=97:3, according to Table 2 so as to adjust Mwa and Va. MWa represents the weight-average molecular weight of acrylic resin, and Va represents the dispersion degree of the molecular weight distribution.

TABLE 1

| Acrylic resin type | Mw × $10^4$ | Mw/Mn |
|---|---|---|
| 1 | 10.5 | 2.1 |
| 2 | 28.5 | 2.5 |
| 3 | 3.0 | 2.0 |

TABLE 2

| Acrylic resin | After mixed | | Mass mixing ratio of acrylic resins | | |
|---|---|---|---|---|---|
| number | Mw (×$10^4$) | Mw/Mn | 1 | 2 | 3 |
| A-1 | 16.0 | 4.2 | 40% | 40% | 20% |

The following materials were mixed in a vacuum nauta mixer at 80° C. and 133 Pa for 3 hours and further dried: 30 parts by mass of cellulose ester C-1 having dried (moisture content of 200 ppm) at 80° C. for 6 hours, 70 parts by mass of acrylic resin A-1, 1.1 parts by mass of Tinuvin 928 (manufactured by BASF Japan Ltd.), 0.25 parts by mass of GSY-P101 (manufactured by SAKAI CHEMICAL INDUSTRY CO., LTD.) as phosphorus based compound, 0.5 parts by mass of Irganox 1010 (manufactured by BASF Japan Ltd.), 0.24 parts by mass Sumilizer GS (manufactured by Sumitomo Chemical Co., Ltd.), 0.2 parts by mass of AEROSIL NAX50 (manufactured by Nippon Aerosil Co., Ltd.), and 0.02 parts by mass of SEAHOSTAR KEP-30 (manufactured by NIPPON SHOKUBAI CO., LTD.). The obtained mixture was melted and mixed in a double screw extruder at 235° C. and was pelleted.

(Making of Optical Films)

Optical films were made by a manufacturing device illustrated in FIG. 1. The film forming speed was set at 50 m/min. The two wind shield plates 50a and 50b of the below-described double-paneled of the first wind shield member 50 were disposed among the shaft-direction ends of the first rotation roll 5, the second rotation roll 6, and the width-direction ends of the film-shaped molten article 40, approximately perpendicular to the surface of the film-shaped molten article 40. Two wind shields are provided for each end and are parallel to each other.

Box-Shaped Third Wind Shield Member 60:

Type: Box-shaped third wind shield member 60 (made of stainless steel; thickness is 1 mm) illustrated in FIGS. 7-10 (second embodiment).

$W_1$=300 mm, $D_1$=250 mm, $H_1$=200 mm, $L_0$=100 mm, $L_1$=50 mm, $L_2$=10 mm, $L_3$=0 mm, $L_4$=1 mm, $L_5$=1 mm.

Thin heater (aluminum cast heater) was attached to all the outer surfaces of the wind shield plate (side panel) 60b of the box-shaped third wind shield member 60, and the heater is controlled so as to set the gas temperature in the box-shaped third wind shield member 60 at the temperatures shown in Table 3.

As shown in FIG. 11, heated air is supplied from the connection members (top panels) 60e of the box-shaped third wind shield member 60 with a heated-air generation device (HAS4020, HAKKO CO., LTD.). The supply volumes (air volumes) were shown in Table 3, and the temperature of the heated air was controlled so as to set the gas temperature in the box-shaped third wind shield member 60 at the temperatures shown in Table 3.

As shown in FIG. 12, the wind shield plates 57a were provided as the second wind shield members 57 between the width-direction end of the film-shaped molten article 40 and the wind shield plate (side panel) 60a of the box-shaped third wind shield member 60 which is closer to the width-direction end of the film-shaped molten article 40. The wind shield plates 57a were plate-shaped members with a thickness of 1 mm and were disposed parallel to the surface of the film-shaped molten article 40 after it was discharged from the die 4 and before it landed on the first rotation roll 5. $L_6$=5 mm, $L_7$=0 mm, $L_8$=0 mm, the gap distance between the wind shield plate 57a and the first rotation roll 6=1 mm.

After the pellets (moisture content of 50 ppm) were melted in a single screw extruder 1, the molten article was discharged in a film state at a melting temperature of 240° C. through the die 4 onto the first rotation roll 5 whose surface temperature is 90° C. Then, the film-shaped molten article on the first rotation roll 5 was pressed with the second rotation roll (elastic touch roll) 6 having a metallic surface with a thickness of 2 mm thickness. The film having passed though the gap between the first rotation roll and the second rotation roll was further conveyed being in contact with the outer surfaces of the second cooling roll 7 and the third cooling roll 8, thereby cooling and solidifying it and then winding the film by the winding device 13. This optical film had a thickness of 80 μm, a width of 2000 mm, and a length in the longer direction of 1000 m.

Examples 2-16 and Comparative Example 1

Optical films were produced in the same way as that of Example 1 except that the conditions of the two wind shield plates 50a and 50b of the double-paneled first wind shield member 50 were varied as shown in Table 3.

The double-paneled first wind shield members 50 were the two wind shield plates 50a and 50b (made of stainless steel; thickness is 1 mm) shown in FIGS. 2-4 (first embodiment), and their dimensions and the gap distance around them were the same as those of the box-shaped third wind shield members 60 of Example 1.

In the case of suctioning inside (between the shield members 60a and 60b) the box-shaped third wind shield members 60, as shown in FIG. 11, a blower was used to suction through the connection members (top plates) 60e of the box-shaped third wind shield member 60. The suction volumes (air volumes) were shown in Table 3.

In the case of suctioning a the two wind shield plates 50a and 50b of the double-paneled first wind shield members 50, as shown in FIG. 5, a blower was used to suction from above between the two wind shield plates 50a and 50b. The suction volumes (air volumes) were shown in Table 3.

In the case of supplying heated air between the two wind shield plates 50a and 50b of the double-paneled first wind shield members 50, as shown in FIG. 5, a heated-air generation device (HAS4020, HAKKO CO., LTD.) was used to supply from above between the wind shield plates 50a and 50b. The supply volumes (air volumes) were shown in Table 3, and the temperatures of the heated air were controlled so as to set the gas temperature between the two wind shield plates 50a and 50b at the temperatures shown in Table 3.

Especially in Comparative Example 1, optical films were produced in the same way as Example 14 except that the outside wind shield members 50b were not installed.

TABLE 3

| | Type of wind shield member | Attachment of heater on wind shield member | Volume of heated air (air volume) supplied to wind shield plate member | | Temperature of wind shield member (° C.) | Installation of second wind shield member | Variation in thickness | |
|---|---|---|---|---|---|---|---|---|
| | | | Suction/ Supply | Air volume (l/min) | | | Degree of variation (%) | Evaluation |
| Example 1 | ** | Yes*[1] | Supply | 70 | 245*[3] | Yes | 1.0 | SS |
| Example 2 | ** | Yes*[1] | Supply | 20 | 245*[3] | Yes | 1.0 | SS |
| Example 3 | ** | Yes*[1] | Suction | 70 | 245*[3] | Yes | 1.6 | S |
| Example 4 | ** | Yes*[1] | Suction | 20 | 245*[3] | Yes | 1.7 | S |
| Example 5 | ** | Yes*[1] | Suction | 100 | 245*[3] | Yes | 2.0 | S |
| Example 6 | ** | — | Supply | 70 | 103*[3] | Yes | 1.7 | S |
| Example 7 | ** | — | Supply | 70 | 187*[3] | Yes | 1.7 | S |
| Example 8 | ** | — | Suction | 70 | 103*[3] | Yes | 2.0 | S |
| Example 9 | ** | — | Suction | 30 | 187*[3] | Yes | 2.0 | S |
| Example 10 | ** | — | Suction | 100 | 90*[3] | Yes | 2.4 | A |
| Example 11 | ** | Yes*[1] | Suction | 70 | 260*[3] | Yes | 2.2 | A |
| Example 12 | ** | — | Supply | 350 | 70*[3] | Yes | 2.3 | A |
| Example 13 | ** | — | — | 0 | 200*[3] | Yes | 2.7 | A |
| Example 14 | Double-paneled wind shield member | Yes*[2] | — | 0 | 200*[4] | Yes | 2.5 | A |
| Example 15 | Box-shaped wind shield | — | — | 0 | 200*[3] | — | 2.7 | A |
| Example 16 | Double-paneled structured wind shield member | Yes*[2] | — | 0 | 200*[4] | — | 2.5 | A |
| Comparative Example 1 | — | — | — | 0 | 40*[5] | — | 7.2 | C |

*[1]The heater is attached to the wind shield plates (side panel) 60b constituting the third wind shield members.
*[2]The heater is attached to the wind shield plates 50b of the double-paneled first wind shield members.
*[3]Inside temperature,
*[4]Temperature between the two wind shield plates,
**Box-shaped third wind shield member
*[5]Temperature at the position 5 mm away from the surface of the single-paneled wind shield plate toward the molten article

[Temperature Between Two Wind Shield Plates, Temperature Inside Box-Shaped Wind Shield Member]

In the Examples and Comparable Example, the temperature between the two wind shield plates and the temperature inside the box-shaped wind shield member were measured at the same position by a thermometer.

[Unevenness in Thickness]

An area of 1 m in the conveyance direction×2000 mm in the width direction was arbitrarily selected on the optical film, and thicknesses were measured at any 200 positions in the area with a contact continuous thickness meter (film thickness tester KG601B made by Anritsu Corporation). The maximum thickness, minimum thickness, and average thickness were obtained from the measured values, and the variation was calculated by the following formula.

Thickness variation $Tr(\%)=\{(\text{maximum thickness}-\text{minimum thickness})/\text{average thickness}\}\times 100$ SS: $Tr \leq 1.0$ (super excellent);
S: $1.0 < Tr \leq 2.0$ (excellent);
A: $2.0 < Tr \leq 3.0$ (good);
B: $3.0 < Tr \leq 4.0$ (acceptable, no problem in actual use); and
C: $4.0 < Tr$ (bad, problematic in actual use).

DESCRIPTION OF THE NUMERALS

1: Extruder
2: Filter
3: Static mixer
4: Flow casting die
5: First rotation roll (first cooling roll)
6: Second rotation roll (touch roll)
7: Second cooling roll
8: Third cooling roll
9, 11, 12: Conveyer roll
10: Pre-stretch film
13: Winding device
40: Film-shaped molten article
50: Double-paneled first wind shield member
57: Single-paneled second wind shield member
50a, 50b, 57a, 60a, 60b: Wind shield plate
55, 63: Suction/supply nozzle
57: wind shield plate B
60: Box-shaped third wind shield member
61, 62: Open side

The invention claimed is:

1. A device for manufacturing an optical film comprising:
a flow casting die configured to discharge in a film state a molten film-constituting-material containing a thermoplastic resin to form a film-shaped molten article;
a pair of rotation rolls configured to cool and solidify the film-shaped molten article by pinching the molten film-shaped article therebetween; and
a pair of wind shield members, each of the wind shield members is provided between a respective end of the rotation rolls in an axial direction of the rotation rolls and the film-shaped molten article, the each of the wind shield members including:
a first wind shield plate; and
a second wind shield plate provided on an outer side of the first wind shield plate in the axial direction, the first wind shield plate and the second wind shield plate being approximately perpendicular to a surface of the film-shaped molten article and approximately parallel to each other.

2. The device for manufacturing an optical film of claim 1, comprising:
a pair of heaters each of which is configured to heat at least one wind shield plate in each of the wind shield members.

3. The device for manufacturing an optical film of claim 1, wherein each of the wind shield members is an independent double-paneled wind shield in which the first wind shield plate and the second wind shield plate are provided independently.

4. The device for manufacturing an optical film of claim 1, wherein each of the wind shield-members has a box shape in which the first wind shield plate and the second wind shield plate are linked to each other at predetermined position, and a side of the box shape facing the rotation roll has an opening.

5. The device for manufacturing an optical film of claim 1, comprising:
a pair of nozzles each of which is provided in each of the wind shield members and between the first wind shield plate and the second wind shield plate, the nozzles each being configured to suction gas or supply heated gas between the first wind shield plate and the second wind shield plate.

6. The device for manufacturing an optical film of claim 2, wherein each of the heaters heats the at least one wind shield plate in each of the windshield members so that a gas temperature between the first wind shield plate and the second wind shield plate is 100° C. to 250° C.

7. The device for manufacturing an optical film of claim 1, wherein each of the wind shield members includes:
a third wind shield plate which is provided between the first wind shield plate and the film-shaped molten article so as to make approximately the same plane as the surface of the film-shaped molten article after being discharged from the flow casting die and before landing on the rotation roll.

8. The device for manufacturing an optical film of claim 5, wherein each of the nozzles suctions the gas or supplies the heated gas between the first wind shield plate and the second wind shield plate so that a gas temperature between the first wind shield plate and the second wind shield plate is 100° C. to 250° C.

9. The device for manufacturing an optical film of claim 1, wherein the first wind shield plate and the second wind shield plate are disposed with a space therebetween allowing an airflow between the first wind shield plate and the second wind shield plate.

* * * * *